US012067413B2

(12) United States Patent
Kamiya et al.

(10) Patent No.: US 12,067,413 B2
(45) Date of Patent: Aug. 20, 2024

(54) APPARATUS FOR DETERMINING RESOURCE MIGRATION SCHEDULE

(71) Applicant: Hitachi, Ltd., Tokyo (JP)

(72) Inventors: Yuushi Kamiya, Tokyo (JP); Hiroyuki Morimoto, Tokyo (JP); Hideo Saito, Tokyo (JP)

(73) Assignee: HITACHI, LTD., Tokyo (JP)

( * ) Notice: Subject to any disclaimer, the term of this patent is extended or adjusted under 35 U.S.C. 154(b) by 530 days.

(21) Appl. No.: 17/470,057

(22) Filed: Sep. 9, 2021

(65) Prior Publication Data

US 2022/0237016 A1 Jul. 28, 2022

(30) Foreign Application Priority Data

Jan. 22, 2021 (JP) .................. 2021-008468

(51) Int. Cl.
*G06F 9/455* (2018.01)
*G06F 9/48* (2006.01)
*G06F 9/50* (2006.01)

(52) U.S. Cl.
CPC ........ *G06F 9/45558* (2013.01); *G06F 9/4856* (2013.01); *G06F 9/5038* (2013.01); *G06F 2009/4557* (2013.01)

(58) Field of Classification Search
CPC .................................................. G06F 9/4881
USPC ............................................................ 718/1
See application file for complete search history.

(56) References Cited

U.S. PATENT DOCUMENTS

| 8,230,069 | B2* | 7/2012 | Korupolu ............ H04L 67/1008 709/229 |
| 9,348,646 | B1* | 5/2016 | Daya ...................... G06F 9/4856 |
| 9,537,745 | B1* | 1/2017 | Halcrow ............... G06F 3/0664 |
| 10,846,129 | B2* | 11/2020 | Hermenier .......... H04L 41/0816 |
| 11,048,546 | B1* | 6/2021 | Shibayama ........... G06F 3/0635 |
| 11,693,684 | B2* | 7/2023 | Shibayama ............. G06F 3/067 718/1 |
| 2007/0220121 | A1* | 9/2007 | Suwarna ............... G06F 9/5077 709/220 |
| 2011/0197039 | A1* | 8/2011 | Green ..................... G06F 3/067 718/1 |
| 2012/0284707 | A1* | 11/2012 | Janakiraman ........... G06F 3/067 718/1 |
| 2014/0059539 | A1* | 2/2014 | Simonsen .......... G06F 11/1484 718/1 |
| 2014/0380303 | A1* | 12/2014 | Bello .................. G06F 9/45558 718/1 |

(Continued)

*Primary Examiner* — Mehran Kamran
(74) *Attorney, Agent, or Firm* — MATTINGLY & MALUR, PC

(57) ABSTRACT

One or more storage devices store resource migration schedule information including a plurality of records. Each of the plurality of records indicating a migration source node and a migration destination node of each of one or more resources. One or more processors are configured to determine a priority of each of the plurality of records such that a record having locality after migration has a higher priority than a priority of a record without locality after migration. The locality is determined based on whether a virtual machine and a volume associated with each other in advance exist in the same node. The one or more processors are configured to determine a migration schedule of each of the plurality of records based on the priority of each of the plurality of records.

11 Claims, 17 Drawing Sheets

(56) References Cited

U.S. PATENT DOCUMENTS

| | | | |
|---|---|---|---|
| 2015/0281347 A1* | 10/2015 | Wang | G06F 11/34 |
| | | | 709/203 |
| 2018/0004425 A1* | 1/2018 | Suzuki | G06F 11/3034 |
| 2018/0157521 A1* | 6/2018 | Arikatla | G06F 9/45558 |
| 2019/0146719 A1* | 5/2019 | McBrearty | G06F 3/0605 |
| | | | 711/154 |
| 2019/0266002 A1* | 8/2019 | Nishikawa | G06F 3/06 |
| 2019/0278624 A1* | 9/2019 | Bade | G06F 9/4856 |
| 2020/0026576 A1* | 1/2020 | Kaplan | G06F 16/2282 |
| 2020/0133718 A1* | 4/2020 | Koehler | G06F 9/5077 |
| 2020/0174815 A1* | 6/2020 | Ramesh | G06F 9/45558 |
| 2020/0174816 A1* | 6/2020 | Ramesh | G06F 9/45558 |
| 2020/0174830 A1* | 6/2020 | Hermenier | H04L 67/101 |
| 2021/0216345 A1* | 7/2021 | Natu | G06F 3/061 |
| 2021/0223977 A1* | 7/2021 | Suzuki | G06F 3/0665 |
| 2021/0326165 A1* | 10/2021 | Shibayama | G06F 3/0631 |
| 2022/0237016 A1* | 7/2022 | Kamiya | G06F 9/4856 |

* cited by examiner

| # | TIME | PRIORITY | RESOURCE | MIGRATION SOURCE | MIGRATION DESTINATION |
|---|------|----------|----------|------------------|------------------------|
| 1 | ? | ? | VM1 | NODE 1 | NODE 2 |
| 2 | ? | ? | VOL1 | NODE 1 | NODE 3 |
| 3 | ? | ? | VM2 VOL2 | NODE 2 | NODE 3 |
| ... | ... | ... | ... | ... | ... |

RESOURCE MIGRATION SCHEDULE INFORMATION (INITIAL STATE)

↙ 213

| Seq | TIME | CPU | IO |
|---|---|---|---|
| 1 | SUNDAY 0:00 | 20 | 20 |
| 2 | SUNDAY 0:01 | 15 | 15 |
| ... | ... | ... | ... |
| 5041 | WEDNESDAY 12:00 | 45 | 50 |
| 5042 | WEDNESDAY 12:01 | 40 | 45 |
| ... |  | ... | ... |
| 10080 | SATURDAY 23:59 | 15 | 10 |

LOAD INFORMATION (MASTER)

| Seq | TIME | CPU | IO |
|---|---|---|---|
| 1 | SUNDAY 0:00 | 30 | 30 |
| 2 | SUNDAY 0:01 | 35 | 35 |
| ... | ... | ... | ... |
| 5041 | WEDNESDAY 12:00 | 55 | 65 |
| 5042 | WEDNESDAY 12:01 | 50 | 55 |
| ... |  | ... | ... |
| 10080 | SATURDAY 23:59 | 25 | 30 |

LOAD INFORMATION (FOR WORK)

| # | TIME | PRIORITY | RESOURCE | MIGRATION SOURCE | MIGRATION DESTINATION |
|---|---|---|---|---|---|
| 1 | ? → SUNDAY, 0:00 | 3 | VM1 VOL1 | NODE 1 | NODE 2 |
| 2 | ? → TUESDAY, 18:00 | 2 | VOL2 | NODE 3 | NODE 1 |
| 3 | ? → WEDNESDAY, 3:00 | 8 | VM3 | NODE 1 | NODE 2 |
| ... | ... | ... | ... | ... | ... |

RESOURCE MIGRATION SCHEDULE INFORMATION

↙ 215

| Seq | TIME | CPU | IO |
|---|---|---|---|
| 1 | SUNDAY 0:00 | 30 | 30 |
| 2 | SUNDAY 0:01 | 35 | 35 |
| ... | ... | ... | ... |
| 5041 | WEDNESDAY 12:00 | 55 | 65 |
| 5042 | WEDNESDAY 12:01 | 50 | 55 |
| ... |  | ... | ... |
| 10080 | SATURDAY 23:59 | 25 | 30 |

LOAD INFORMATION (TEMPORARY)

| # | TIME | PRIORITY | RESOURCE | MIGRATION SOURCE | MIGRATION DESTINATION |
|---|---|---|---|---|---|
| 1 | ?→ TUESDAY 0:00 | 3 | VM1 VOL1 | NODE 1 | NODE 3 → NODE 2 |
| 2 | ?→ WEDNESDAY 2:00 | 3 | VM1 VOL1 | NODE 2 | NODE 3 |
| 3 | SATURDAY 2:00 | 2 | VOL2 | NODE 3 | NODE 2 |
| ... | ... | ... | ... | ... | ... |

RESOURCE MIGRATION SCHEDULE INFORMATION

FIG. 20

APPARATUS FOR DETERMINING RESOURCE MIGRATION SCHEDULE

CLAIM OF PRIORITY

This application claims priority from Japanese patent application JP 2021-008468 filed on Jan. 22, 2021, the content of which is hereby incorporated by reference into this application.

BACKGROUND

This invention relates to an apparatus for determining a resource migration schedule.

As the background art in the technical field, there is US 2018/0157521 A1. In US 2018/0157521 A1, the following matters are disclosed (refer to Abstract). Examples described in US 2018/0157521 A1 include a virtualized file server including load balancing. For example, a recommendation engine estimates a load associated with each of a plurality of file server virtual machines in a cluster. Based on the load, the recommendation engine recommends changing ownership of one or more volume groups, scaling up a virtualized file server, scaling down the virtualized file server, scaling in the virtualized file server, scaling out the virtualized file server, or combinations thereof.

In a cluster system in which a plurality of computer nodes are coupled by a network, a virtual machine is running on each computer node, and a volume is built on each computer node, resources including the virtual machines and the volumes may be reallocated without stopping the system. In the resource reallocation, a virtual machine and/or a volume in a running state is migrated from a given computer node to another computer node.

The resource reallocation is used for load balancing and scaling up (for example, increasing the number of apparatus) of the system. For example, resource reallocation is used to avoid a situation in which a hardware resource becomes insufficient due to an increase in the load of a virtual machine or volume running on a computer node, thereby causing the computer node to become overloaded. As another example, when the system is expanded by adding a new node to the system, a virtual machine and/or a volume is migrated from an existing computer node to the new computer node.

During the resource reallocation in the cluster system, I/O performance of the system may deteriorate. Therefore, a technology which can suppress the deterioration in I/O performance in resource reallocation is desired.

SUMMARY OF THE INVENTION

A representative example of this invention is an apparatus for determining a migration schedule of a resource including a virtual machine and a volume in a cluster including a plurality of nodes. The apparatus includes one or more processors and one or more storage devices. The one or more storage devices are configured to store resource migration schedule information including a plurality of records. Each of the plurality of records indicates a migration source node and a migration destination node of each of one or more resources. The one or more processors are configured to determine a priority of each of the plurality of records such that a record having locality after migration has a higher priority than a priority of a record without locality after migration. The locality is determined based on whether a virtual machine and a volume associated with each other in advance exist in the same node. The one or more processors are configured to determine a migration schedule of each of the plurality of records based on the priority of each of the plurality of records.

According to at least one aspect of this invention, in a system including the cluster including the plurality of nodes configured to communicate to and from each other, a deterioration in system performance during resource reallocation including the virtual machine and the volume can be suppressed.

BRIEF DESCRIPTION OF THE DRAWINGS

FIG. 14A is a table for showing a configuration example of the load information (master) of a given one node.

FIG. 14B is a table for showing a configuration example of the load information (for work) of the same node updated by the resource reallocation processing described with reference to FIG. 13.

FIG. 19 is a table for showing a configuration example of the load information (temporary).

FIG. 20 is a table for schematically showing an example of the update to the resource migration schedule information which occurs together with the determination of the migration period of the resource migration via an intermediate node.

DETAILED DESCRIPTION OF THE EMBODIMENTS

Figure 1:
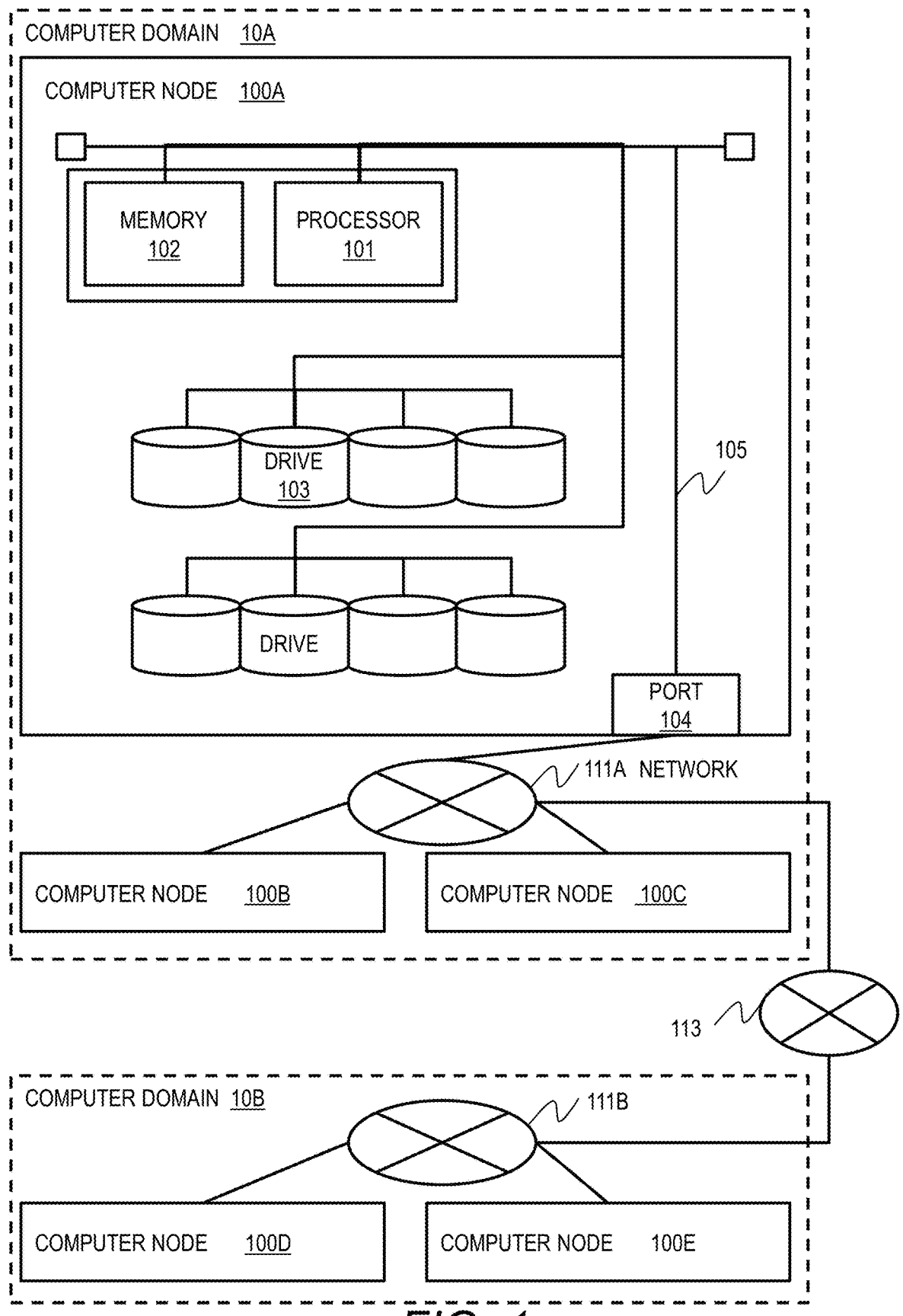
FIG. 1 is a diagram for illustrating a configuration example of a computer system in the at least embodiment of this specification.

The following description is divided into a plurality of sections or a plurality of embodiments if necessary for convenience. However, unless explicitly noted otherwise, the embodiments or sections are not irrelevant to one another, and one is related to another as a modification example, detailed or supplementary description, or the like of a part of or the entirety of another. When the count of pieces of a component or the like (including the count, numerical value, amount, and range of a component) is mentioned in the following description, this disclosure is not limited to the particular count mentioned and the component count can be higher or lower than the particular count, unless explicitly noted otherwise or unless it is theoretically obvious that the component count is limited to the particular count.

A computer system can include one computer or a plurality of computers capable of communicating to and from each other. A computer apparatus, the computer system, or a computational resource group includes one or more interface devices (including, for example, a communication device and an input/output device), one or more storage devices (including, for example, a memory (main storage) and an auxiliary storage device), and one or more processors.

When a function is implemented by a processor executing a program, predetermined processing is appropriately performed through use of, for example, a storage device and/or an interface device, and hence the function may be set as at least a part of the processor. The processing described with the function as the subject may be set as processing performed by a processor or a system including the processor.

The program may be installed from a program source. Examples of the program source may include a program distribution computer and a computer-readable storage medium (for example, a computer-readable non-transitory storage medium). The description of each function is merely an example, and a plurality of functions may be combined into one function, or one function may be divided into a plurality of functions.

At least one embodiment of this specification includes a cluster consisting of a plurality of computer nodes (hereinafter also simply referred to as "nodes") capable of communicating to and from each other via a network. Each computer node stores at least one of a virtual machine or a volume. The virtual machine accesses one or more associated volumes.

The presence or absence of locality is determined based on whether or not the virtual machines and volumes associated with each other exist on the same computer node. In the at least one embodiment of this specification, a priority of each of a plurality of resource migrations is determined such that the priority of records having locality after migration is higher than the priority of records not having locality after migration, and the migration schedule is determined based on those priorities. As a result, it is possible to suppress an increase in the node load during resource reallocation. Specific examples of this disclosure are now described.

FIG. 1 is a diagram for illustrating a configuration example of a computer system in the at least embodiment of this specification. The computer system includes a plurality of computer domains for communicating to and from each other via a network. In FIG. 1, two computer domains 10A and 10B are illustrated as an example, and those computer domains 10A and 10B communicate to and from each other via a network 113, for example, a WAN. The computer domains 10A and 10B are arranged at different sites, for example.

Each computer domain includes a plurality of computer nodes which communicate to and from each other via a network. Each computer node is a physical computer apparatus, and in the following, the computer nodes are also simply referred to as "nodes". In the configuration example of FIG. 1, the computer domain 10A includes three computer nodes 100A to 100C, which communicate to and from each other via a network 111A, for example, a LAN. The computer domain 10B includes computer nodes 100D and 100E, which communicate to and from each other via a network 111B, for example, a LAN.

The computer nodes can have the same configuration or different configurations. In FIG. 1, the configuration of the computer node 100A is illustrated as an example. The computer node 100A includes a processor 101, a memory 102 serving as a main storage device, a plurality of storage drives 103 serving as a secondary storage device, and a port 104 for communicating to and from other computer nodes via the network. In FIG. 1, one storage drive is indicated by reference numeral 103 as an example. Those components of the storage drives communicate to and from each other via a bus 105.

The memory 102 is, for example, a DRAM, which is a volatile storage device. The storage drive 103 is, for example, a solid state drive (SSD) or a hard disk drive (HDD), which are non-volatile storage devices. The number of each component of the computer node 100A is not particularly limited, and other components, for example, an input/output device may be included.

The programs (command codes) executed by the processor 101 and the information used by the programs are stored in the storage drive 103 and loaded onto the memory 102, for example. The processor 101 implements a predetermined function by executing a program stored in the memory 102 (operating in accordance with a command in the program). The processor 101 may include one or a plurality of processor units or processor cores. The other computer nodes can also include the above-mentioned components. The number of those components is not particularly limited.

Virtualization software for building a virtual environment in which virtual machines run operates on each computer node. Each computer node can run a virtual machine on the virtualization software. The virtualization method is not particularly limited, and may be, for example, a host type, a hypervisor type, or a container type. Further, each computer node can store volumes. The storage area of the volumes stored on the computer node is given from the storage drive of the computer node.

Each computer node can access the volumes stored on that computer node as well as the volumes stored on any other computer node. Therefore, a virtual machine running on a certain computer node can access the volumes stored on that computer node as well as the volumes stored on the other computer nodes.

In the configuration example described below, each volume is mounted on one virtual machine, and those volumes are associated with each other. The virtual machine accesses the mounted volume. A plurality of volumes can be mounted on one virtual machine. The virtual machine accesses each of the one or more mounted volumes. The virtual machine is, for example, a virtual machine having a predetermined server function.

The computer system can migrate, between computer nodes, a virtual machine and a volume which are running. Specifically, the virtual machine can execute required processing even during a period of the migration. Further, during the migration period of a volume, the data of that volume can be accessed. Virtual machines and volumes are also referred to as "software resources", or simply "resources".

In the migration of a virtual machine from a migration source node to a migration destination node, the virtual machine of the migration source node operates until the migration (copying) is complete, and the virtual machine of the migration destination node starts to operate after the migration (copying) is complete. After the migration, the virtual machine of the migration source node is deleted. In the migration of a volume from the migration source node to the migration destination node, the volume of the migration source node is accessed until the migration (copying) is complete, and the volume of the migration destination node is accessed after the migration is complete. After the migration, the volume of the migration source node is deleted.

An example of the computer system is a hyper-converged system, which is also referred to as "hyper-converged infrastructure (HIC)". As described above, each computer node includes a local storage drive, and is coupled via a network to form a cluster.

Storage virtualization technology is applied in the computer system. The local storage (storage drives) of the computer nodes in the cluster appears as one virtual volume pool (also referred to as "virtual storage pool"). The storage drives of the entire cluster are managed and operated as a single storage pool. Each volume is included in the virtual volume pool. The data is distributed and stored in the plurality of computer nodes. The storage function can be performed by a virtual machine or virtualization software which operates on virtualization software.

The computer system reallocates software resources, that is, migrates the virtual machines and volumes, at a predetermined time, for example, periodically, in accordance with an instruction from an administrator, or at the time of node expansion or reduction. A method of scheduling the resource reallocation is now described.

One or a plurality of computers can execute the resource reallocation scheduling. The computer which executes the scheduling may be a computer node in the cluster, or may be a computer which executes only management and does not operate a virtual machine. In the example described below, it is assumed that one computer node included in the cluster executes the resource reallocation scheduling.

Resource reallocation in the cluster imposes a resource migration load on the migration source node and the migration destination node, and thus reduces the I/O performance of those nodes. Therefore, it is desired to suppress the increase in load on the migration source node and the migration destination node in resource reallocation. In the at least one embodiment of this specification, the increase in load on the migration source node and the migration destination node in resource reallocation is suppressed by determining the resource reallocation schedule based on the locality of the virtual machines and the volumes.

A state in which there is locality is a state in which a virtual machine and a volume associated with each other exist on the same node. The virtual machine accesses the associated volume. When the associated virtual machine and volume are on different nodes, this state is a state in which there is not locality. When a virtual machine is associated with a plurality of volumes, the state in which the virtual machine and all the associated volumes exist on the same node is a state in which there is locality. In the following, for the sake of simplicity of description, it is assumed that only one volume is associated with each virtual machine.

In a state in which there is locality, I/O between the virtual machine and the volume (storage drive) is completed within the same node. Therefore, a state in which there is locality has a lower CPU load and a lower I/O load on the node and has a lower delay than in a state in which there is not locality.

In this way, when there is not locality, the load on the node is higher than when there is locality. Therefore, the computer node refers to the state before and after resource migration and schedules resource reallocation such that the duration of the state in which there is locality becomes longer. Through determination of the resource reallocation schedule based on changes in locality, it is possible to migrate resources while suppressing an increase in the load on the node.

As described later, in the at least one embodiment of this specification, the resource reallocation schedule is determined based on the load status of the migration source node and the migration destination node in addition to changes in locality. As a result, the possibility that the load on the migration source node and the migration destination node exceeds a threshold value can be reduced. It should be noted that it is not required to refer to the load status of the migration destination node and the migration source node.

Figure 2:
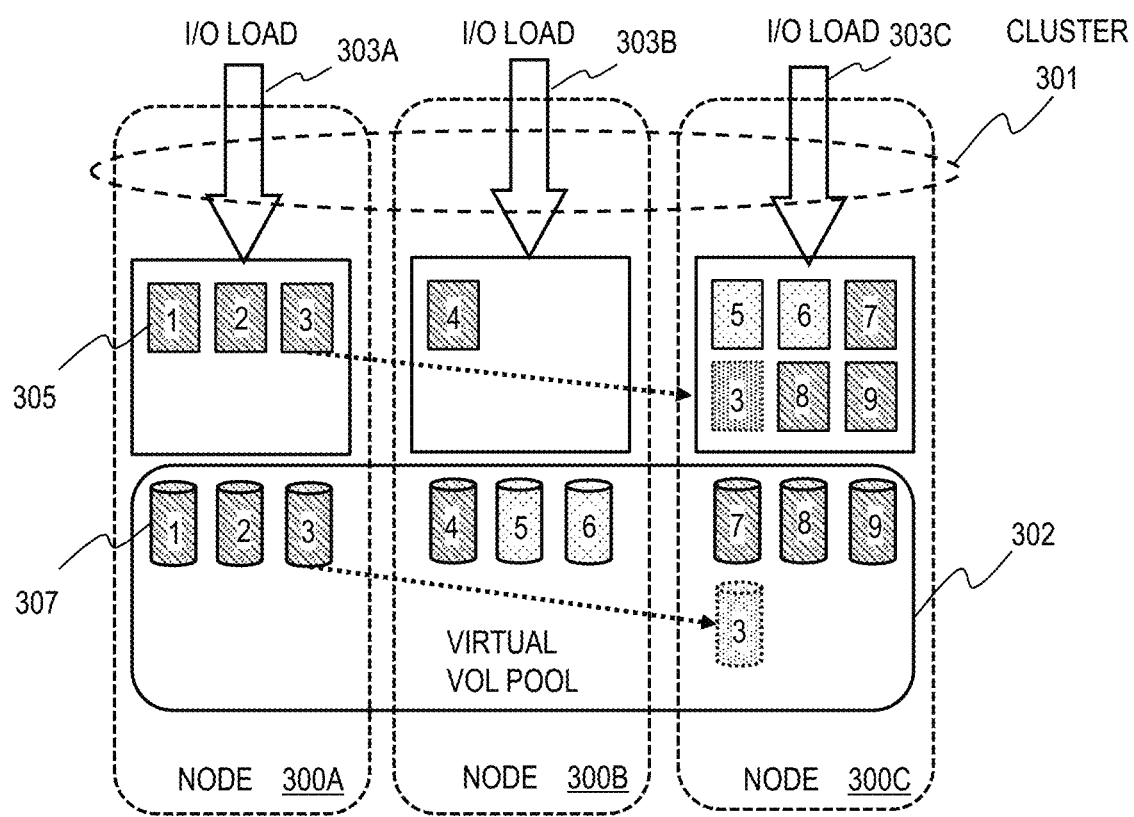
FIG. 2 is a diagram for illustrating an example of resource migration.

FIG. 2 is a diagram for illustrating an example of resource migration. In the configuration example of FIG. 2, nodes 300A, 300B, and 300C are included in the same cluster 301. In FIG. 2, there is illustrated an example of migrating a virtual machine (3) 305 and a volume (3) 307 from the node 300A to the node 300C.

In FIG. 2, the rectangles surrounding the numbers indicate virtual machines. As an example, one virtual machine is indicated by reference numeral 305. Further, the cylinders surrounding the numbers indicate volumes. As an example, one volume is indicated by reference numeral 307. The virtual machine 305 and a volume having the same number as each other are associated with each other.

In the configuration example of FIG. 2, virtual machines (1) 305 to (3) 305 and volumes (1) 307 to (3) 307 exist in the node 300A. A virtual machine (4) 305 and volumes (4) 307 to (6) 307 exist in the node 300B.

Virtual machines (5) 305 to (9) 305 and volumes (7) 307 to (9) 307 exist in the node 300C. The volumes (1) 307 to (9) 307 are included in one virtual volume pool 302.

Before the virtual machine (3) 305 and volume (3) 307 are migrated, the virtual machine (5) 305 and volume (5) 307, and the virtual machine (6) 305 and volume (6) 307, are in a state in which there is not locality. The other pairs of the virtual machines 305 and volumes 307 associated with each other are in a state in which there is locality. At the nodes 300A, 300B, and 300C, there are I/O loads 303A, 303B, and 303C via the external network accompanying the operation of the stored virtual machines.

When the virtual machine (3) 305 and volume (3) 307 are migrated from the migration source node 300A to the migration destination node 300C, the virtual machine (3) 305 and volume (3) 307 transition from a state in which there is locality to a state in which there is locality.

In another example, when only one of the virtual machine (3) 305 and the volume (3) 307 is migrated to the another node, the locality between the virtual machine (3) 305 and the volume (3) 307 changes from a state in which there is locality to a state in which there is not locality. Further, when the virtual machines (3) 305 and the volume (3) 307 are migrated to different nodes, the locality between the virtual machine (3) 305 and the volume (3) 307 changes from a state in which there is locality to a state in which there is not locality.

Resource migration can migrate only virtual machines, migrate only volumes, or migrate both virtual machines and volumes associated with each other. For example, when only the virtual machine (5) 305 is migrated from the migration source node 300C to the migration destination node 300B, the virtual machine (5) 305 and the volume (5) 307 change from a state in which there is not locality to a state in which there is locality. When only the volume (5) 307 is migrated from the migration source node 300B to the migration destination node 300C, the locality between the virtual machine (5) 305 and the volume (5) 307 changes from a state in which there is not locality to a state in which there is locality.

When the virtual machine (5) 305 and the volume (5) 307 are migrated to the same node, the locality between the virtual machine (5) 305 and the volume (5) 307 changes from a state in which there is not locality to a state in which there is locality. When the virtual machine (5) 305 and the volume (5) 307 are migrated to different nodes, the locality between the virtual machine (5) 305 and the volume (5) 307 transitions from a state in which there is not locality to a state in which there is not locality.

Figure 3A:
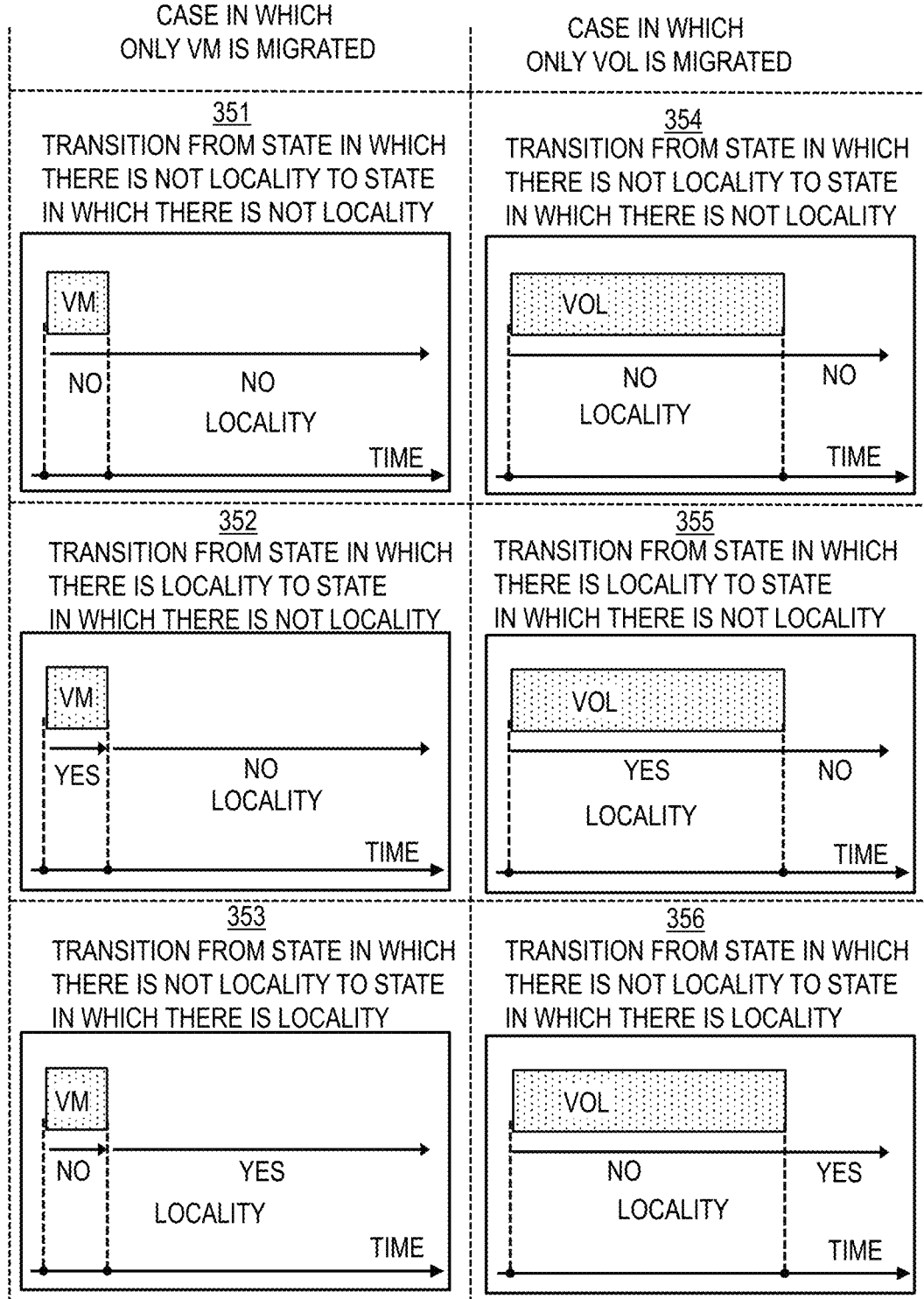
In FIG. 3A and FIG. 3B, there are illustrated relationships between resource migration and locality.
Figure 3B:
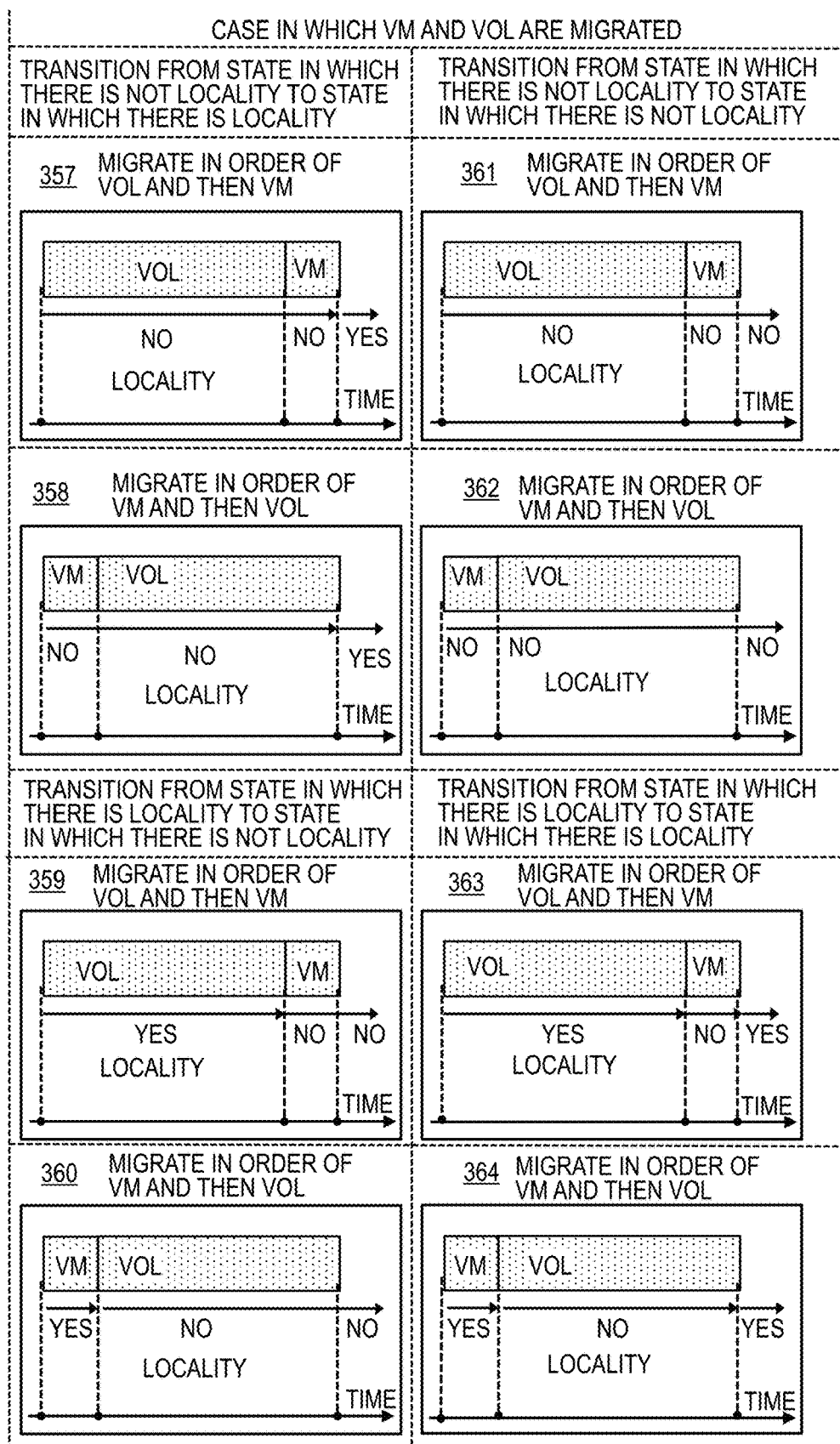

As described above, there are various transitions in the locality state depending on the mode of the resource migration. In FIG. 3A and FIG. 3B, there are illustrated relationships between resource migration and locality. The transitions in the locality state which occur together with resource migration are illustrated for each resource to be migrated. In FIG. 3A and FIG. 3B, the rectangle surrounding each "VM" indicates the migration period of the virtual machine, and the rectangle surrounding each "VOL" indicates the migration period of the volume.

In FIG. 3A, resource migrations 351 to 353 represent cases in which only the virtual machine is migrated. Locality changes when migration of the virtual machine is complete. In the resource migration 351, the locality transitions from a state in which there is not locality to a state in which there is not locality. Specifically, the virtual machine is migrated from a migration source node different from the associated volume to a migration destination node different from that volume.

In the resource migration 352, the locality transitions from a state in which there is locality to a state in which there is not locality. Specifically, the virtual machine is migrated from the same migration source node as the node on which the associated volume exists to a migration destination node different from the node on which that volume exists. In the resource migration 353, the locality transitions from a state in which there is not locality to a state in which there is locality. Specifically, the virtual machine is migrated from a migration source node different from the node on which the associated volume exists to the same migration destination node as the node on which the volume exists.

Resource migrations 354 to 356 represent cases in which only a volume is migrated. Locality changes when the migration of the volume is complete. In the resource migration 354, the locality transitions from a state in which there is not locality to a state in which there is not locality. Specifically, the volume is migrated from a migration source node different from the node on which the associated virtual machine exists to a migration destination node different from the node on which that virtual machine exists.

In the resource migration 355, the locality transitions from a state in which there is locality to a state in which there is not locality. Specifically, the volume is migrated from the same migration source node as the node on which the associated virtual machine exists to a migration destination node different from the node on which the virtual machine exists. In the resource migration 356, the locality transitions from a state in which there is not locality to a state in which there is locality. Specifically, the volume is migrated from a migration source node different from the node on which the associated virtual machine exists to the same migration destination node as the node on which the virtual machine exists.

In FIG. 3B, there are illustrated cases 357 to 364 in which both of the virtual machine and the volume associated with each other are migrated. Resource migrations 357 and 358 are examples of transitions from a state in which there is not locality to a state in which there is locality. The virtual machine and the volume are migrated from different migration source nodes to the same migration destination node.

In the resource migration 357, the virtual machine is migrated after the volume is migrated. When the migration of the volume and the virtual machine is complete, the locality transitions from a state in which there is not locality to a state in which there is locality. In the resource migration 358, the volume is migrated after the virtual machine is migrated. When the migration of the virtual machine and the volume is complete, the locality transitions from a state in which there is not locality to a state in which there is locality.

Resource migrations 359 and 360 are examples of transitions from a state in which there is locality to a state in which there is not locality. The virtual machine and the volume are migrated from the same migration source node to different migration destination nodes. In the resource migration 359, the virtual machine is migrated after the volume is migrated. When the migration of the volume is complete, the locality transitions from a state in which there is locality to a state in which there is not locality. In the resource migration 360, the volume is migrated after the virtual machine is migrated. When the migration of the virtual machine is complete, the locality transitions from a state in which there is locality to a state in which there is not locality.

Resource migrations 361 and 362 are examples of transitions from a state in which there is not locality to a state in which there is not locality. The virtual machine and the volume are migrated from different migration source nodes to different migration destination nodes. In the resource migration 361, the virtual machine is migrated after the volume is migrated. In the resource migration 360, the volume is migrated after the virtual machine is migrated.

During the resource migrations 361 and 362, the locality is always in a state in which there is not locality.

Resource migrations 363 and 364 are examples of transitions from a state in which there is locality to a state in which there is locality. The virtual machine and the volume are migrated from the same migration source node to the same migration destination node.

In the resource migration 363, the virtual machine is migrated after the volume is migrated. When the migration of the volume is complete, the locality transitions from a state in which there is locality to a state in which there is not locality. In the subsequent migration period of the virtual machine, a state in which there is not locality continues. When the migration of the virtual machine is complete, the locality transitions from a state in which there is not locality to a state in which there is locality.

In the resource migration 364, the volume is migrated after the virtual machine is migrated. When the migration of the virtual machine is complete, the locality transitions from a state in which there is locality to a state in which there is not locality. In the subsequent migration period of the volume, a state in which there is not locality continues. When the migration of the volume is complete, the locality transitions from a state in which there is not locality to a state in which there is locality.

As described with reference to FIG. 3B, in the migration of a virtual machine and a volume associated with each other, the resource to be migrated first can be selected between the virtual machine and the volume. From the viewpoint of the load on the node, during the resource migration period, a longer period in which there is locality is better. The volume migration period is longer than the virtual machine migration period.

As illustrated in the resource migrations 359, 360, 363, and 364, in the migration of both the virtual machine and the volume from a state in which there is locality, the time period in which there is not locality is shorter when the volume is migrated first. Therefore, in the at least one embodiment of this specification, when both the virtual machine and the volume are migrated from a state in which there is locality, the volume is migrated first, and then the virtual machine is migrated.

Specifically, in the at least one embodiment of this specification, in a resource migration causing a transition from a state in which there is locality to a state in which there is not locality, as illustrated in the resource migration 359, the virtual machine is migrated after the volume is migrated. Further, in a resource migration causing a transition from a state in which there is locality to a state in which there is locality, as illustrated in the resource migration 363, the virtual machine is migrated after the volume is migrated. In the case of only one of those cases, it may be determined to migrate the volume first.

In resource migration cases other than those described above, the period in which there is locality or there is not locality does not change regardless of which of the virtual machine or the volume is migrated first. Therefore, in the at least one embodiment of this specification, when both a virtual machine and a volume associated with each other are migrated, it may be determined to always migrate the volume first and then migrate the virtual machine.

In the resource migration period, the load on the migration source node and the migration destination node is the sum of the load associated with the normal operation of the virtual machine and the load of the resource migration. In order to perform resource migration while maintaining the running state of the computer system, at both the migration source node and the migration destination node in the resource migration period, it is important that the load is not too large.

Therefore, in the at least one embodiment of this specification, the sum of the normal load and the migration load on the migration source node and the migration destination node during the resource migration period is estimated, and the resource reallocation schedule is executed based on the estimation result. The resource migration can be scheduled more appropriately by determining the resource reallocation (resource migration) schedule based on the load status and locality of the computer node.

There are two main loads on the computer node. One is the CPU load and the other is the I/O load to and from the external network. The CPU load can be expressed by, for example, a CPU usage rate, and the I/O load can be expressed by IOPS, which is the I/O load between the computer node and other nodes or the external network. In the at least one embodiment of this specification, resource migration scheduling is executed such that both the CPU load and the I/O load are less than a threshold value during the resource migration period. This enables the computer node to be operated more appropriately during the resource migration period. Depending on the design, it may be possible to refer to only one of the CPU load and the I/O load.

Figure 4A:
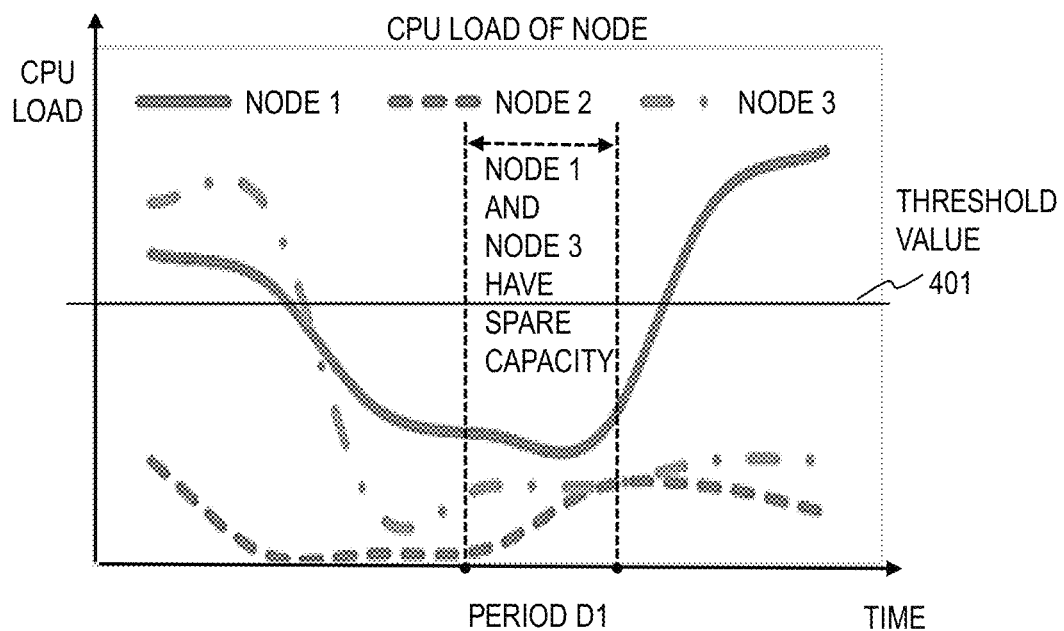
FIG. 4A and FIG. 4B show, for each of three nodes, an estimation value of a change over time in the CPU load within a predetermined period and a change over time in the I/O load within the predetermined period, respectively.
Figure 4B:
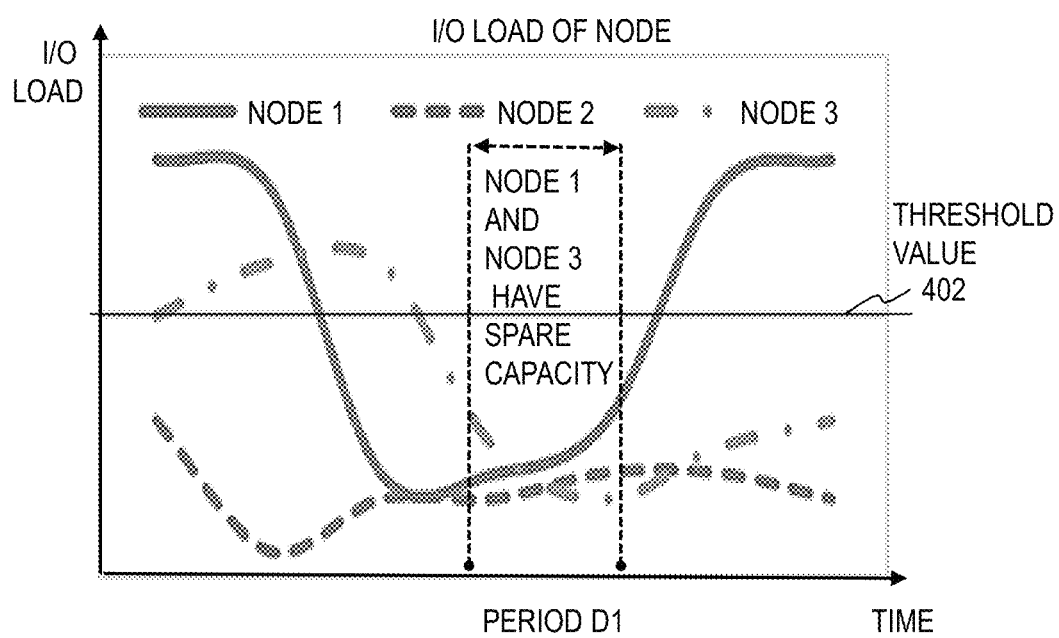

FIG. 4A and FIG. 4B show, for each of three nodes, an estimation value of a change over time in the CPU load within a predetermined period and a change over time in the I/O load within the predetermined period, respectively. In the graph of FIG. 4A, the horizontal axis represents time, and the vertical axis represents the estimation value of the CPU load. In the graph of FIG. 4B, the horizontal axis represents time, and the vertical axis represents the estimation value of the I/O load. FIG. 4A and FIG. 4B show the load estimation values for resource migration from a node 1 to a node 3. The solid line indicates the load of the node 1, the broken line indicates the load of a node 2, and the alternate long and short dash line indicates the load of the node 3.

Migration of the virtual machine and the volume applies a CPU load and an I/O load to each of the migration source node and the migration destination node. Therefore, the CPU load and the I/O load increase during the migration period of the virtual machine and the volume. The load estimation value of the node 1 and the node 3 indicates the sum of the load estimation value due to normal operation and the load estimation value due to the resource migration. The load estimation value of the node 2 indicates only the load estimation value in normal operation.

The load estimation value in normal operation can be determined based on, for example, past load history information. One example is the average value of the load over a predetermined period in the past. The predetermined period of the estimation value of the load over time is, for example, one day, one week, or one month.

For example, the load (load per unit time) during the migration of the virtual machine and the volume is set in advance for each of the migration source node and the migration destination node in accordance with a data transfer rate. The migration period can be calculated in accordance with the data transfer rate between nodes and the size of the virtual machine and the volume. The migration load and the migration period may be estimated by any method.

In the at least one embodiment of this specification, the migration period of the resource is determined as the period in which the sum of the estimation value based on the history information on the CPU load and the I/O load and the estimation value of the amount of increase in the CPU load and the I/O load due to the resource migration is less than each threshold value. The total load is required to be less than the threshold values at the migration source node and the migration destination node.

In FIG. 4A, a threshold value 401 indicates a CPU load upper limit value required for the node during resource migration. In FIG. 4B, a threshold value 402 indicates an I/O load upper limit value required for the node during resource migration. In FIG. 4A and FIG. 4B, it is shown that there is still spare capacity in the CPU load and the I/O load at the node 1 and the node 3 during a migration period D1. In this way, by estimating the load change of each node through use of past performance data and taking the load increase at the time of migration into consideration, the migration of the virtual machine and the volume can be appropriately scheduled.

As described above, the load of the migration source node and the migration destination node changes over time. Therefore, there may be a case in which the load of any one of the resource migration source node and the migration destination node is high, and it is not possible to directly migrate the resource within the predetermined period.

As described later, in the at least one embodiment of this specification, when there is no migration period in which the load is less than the threshold value due to changes over time in the load of the migration source node and the migration destination node, a search is performed to find another intermediate node having spare load capacity. The computer system temporarily migrates the resource to the intermediate node temporarily having spare capacity, and completes the resource migration via the intermediate node. As a result, scheduling can be performed such that the resource migration is completed within a predetermined period determined in advance while reducing an impact on performance due to competition between the I/O load and the resource migration. The predetermined period during which reallocation can be executed is a part or all of the period indicating the change over time in the load estimation value.

Figures 5, 6:
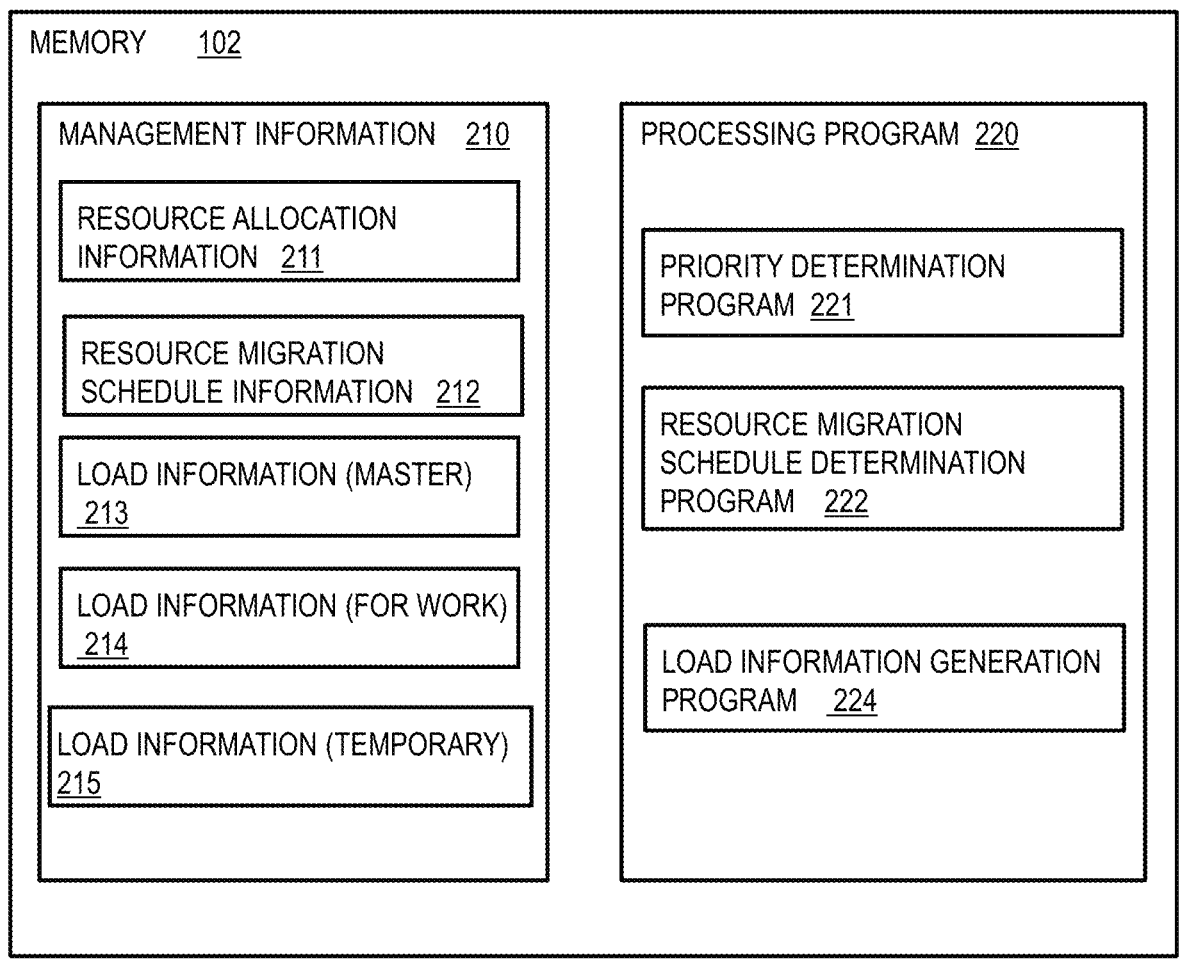
In FIG. 5, there are illustrated management information and a processing program which are stored in a computer node executing scheduling of reallocation (migration) of software resources in a computer system.
FIG. 6 is a table for showing a configuration example of the resource migration schedule information before the start of resource reallocation scheduling (initial state).

In the following, the method of scheduling resource reallocation is described more specifically. In FIG. 5, there are illustrated management information and a processing program which are stored in a computer node executing scheduling of reallocation (migration) of software resources in a computer system. At least a part of the information illustrated in FIG. 5 is shared with another computer node. In FIG. 5, data stored in the memory 102 is illustrated for convenience, but at least a part of the data may be stored in the storage drive 103, and at least a part of the data may be loaded from the storage drive 103.

Management information 210 includes resource allocation information 211, resource migration schedule information 212, load information (master) 213, load information (for work) 214, and load information (temporary) 215. A processing program 220 includes a priority determination program 221, a resource migration schedule determination program 222, and a load information generation program 224.

The resource allocation information 211 indicates information on the nodes included in the computer system and the virtual machines and volumes currently stored in each of the nodes. The resource allocation information 211 indicates information on the virtual machine and the volume to be referred to in order to calculate the resource migration load and the migration period. The resource allocation information 211 also indicates the volume associated with each virtual machine.

The resource migration schedule information 212 indicates information on each resource migration. Specifically, the resource migration schedule information 212 indicates information on the resource to be migrated, the migration source node, the migration destination node, a priority, and a migration start time. In the example described below, the resource to be migrated, the migration source node, and the migration destination node are determined by another system function or by the administrator before resource reallocation scheduling. The processing program 220 determines the priority and the migration start time.

The load information (master) 213 indicates the change over time in the CPU load estimation value and the change over time in the I/O load estimation value during normal operation of each node. The load information (for work) 214 is created and used by the resource migration schedule determination program 222 to schedule direct resource migration between the migration source node and the migration destination node. The resource migration schedule determination program 222 copies the load information (master) 213, to create the load information (for work) 214 of an initial state, and updates the load information (for work) 214 based on the resource migration load in order to determine the resource reallocation schedule.

The load information (temporary) 215 is created and used by the resource migration schedule determination program 222 to schedule resource migration via an intermediate node. The resource migration schedule determination program 222 copies the load information (for work) 214, creates the load information (temporary) 215 of an initial state, and updates the load information (temporary) 215 based on the resource migration load in order to determine a constant-speed migration schedule.

The priority determination program 221 determines the priority of each resource migration in the resource reallocation scheduling based on the locality changes of those resource migrations. The resource migration schedule determination program 222 determines the start time of each resource migration based on the priority and the load estimation values of the migration destination node and the migration source node. The resource migration schedule determination program 222 determines the migration period by prioritizing migrations having a higher priority. The load information generation program 224 generates the load information (master) 213.

FIG. 6 is a table for showing a configuration example of the resource migration schedule information 212 before the start of resource reallocation scheduling (initial state). Each record shows information on the resource migration to be executed within a predetermined period. The resource migration schedule information 212 includes a time field 451, a priority field 452, a resource field 453, a migration source field 454, and a migration destination field 455.

The time field 451 indicates the start time of the resource migration. The priority field 452 indicates the priority of the resource migration determined by the priority determination program 221. The values in the time field 451 and the priority field 452 are input by the processing program 220.

The resource field 453 indicates the resource to be migrated. The migration target is only a virtual machine, only a volume, or a virtual machine and a volume. The migration source field 454 indicates the migration source node of the resource. The migration destination field 455 indicates the migration destination node of the resource. The values in the resource field 453, the migration source field 454, and the migration destination field 455 are set before the resource reallocation scheduling.

Figure 7:
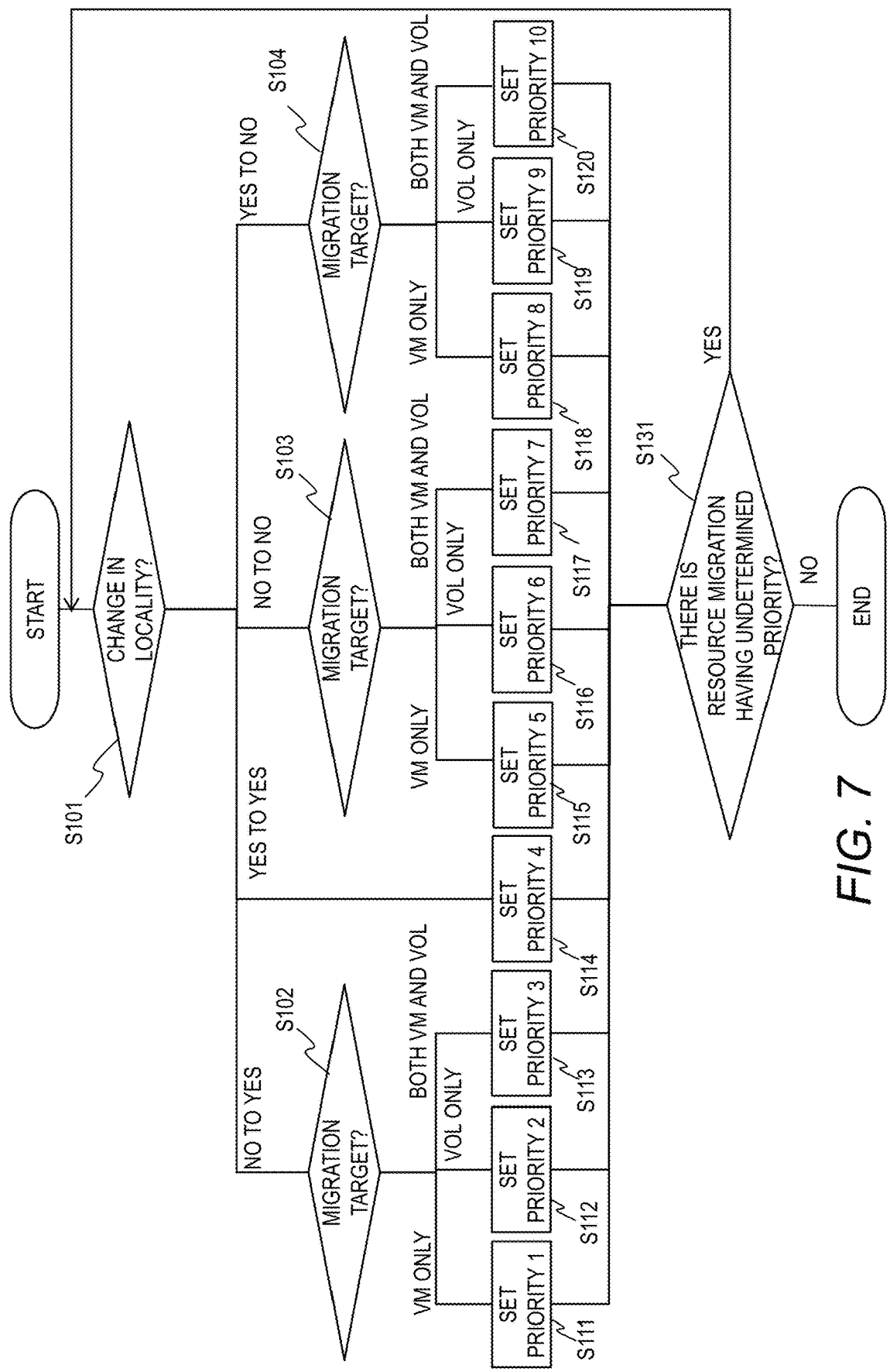
FIG. 7 is a flowchart for illustrating an example of priority determination processing executed by the priority determination program 221.

FIG. 7 is a flowchart for illustrating an example of priority determination processing executed by the priority determination program 221. The priority determination program 221 sequentially selects the resource migration (record) indicated by the resource migration schedule information 212, and determines the priority of each selected resource migration (record). In the following description, a smaller number indicates a higher priority.

The priority determination program 221 selects an unprocessed record from the resource migration schedule information 212, and determines the change in locality before and after the migration of the resource. The method of determining the locality is as described above. When a virtual machine and a volume associated with each other are stored on the same node, there is locality, and otherwise, there is not locality.

When the resource to be migrated is only a part of the resources associated with each other (is only the virtual machine or only the volume), the priority determination program 221 can refer to the resource allocation information 211, and learn the current node of another resource associated with the resource to be migrated.

When the locality changes from a state in which there is not locality to a state in which there is locality (Step S101: NO to YES), the priority determination program 221 determines the resource to be migrated indicated by the record (Step S102). When the migration target is only a virtual machine (Step S102: VM only), the priority determination program 221 determines that the priority of the record (resource migration) to be 1. The priority determination program 221 sets the determined priority value in the resource migration schedule information 212 (Step S111).

When the migration target is only a volume (Step S102: VOL only), the priority determination program 221 determines the priority of the record (resource migration) to be 2. The priority determination program 221 sets the determined priority value in the resource migration schedule information 212 (Step S112).

When the migration target is a virtual machine and a volume associated with each other (Step S102: both VM and VOL), the priority determination program 221 determines the priority of the record (resource migration) to be 3. The priority determination program 221 sets the determined priority value in the resource migration schedule information 212 (Step S113).

In Step S101, when the locality changes from a state in which there is locality to a state in which there is locality (Step S101: YES to YES), the priority determination program 221 determines that the priority of the record (resource migration) to be 4. When the locality changes from "YES" to "YES", a virtual machine and a volume associated with each other are migrated. The priority determination program 221 sets the determined priority value in the resource migration schedule information 212 (Step S114).

In Step S101, when the locality changes from a state in which there is not locality to a state in which there is not locality (Step S101: NO to NO), the priority determination program 221 determines the resource to be migrated indicated by the record (Step S103). When the migration target is only a virtual machine (Step S103: VM only), the priority determination program 221 determines that the priority of the record (resource migration) to be 5. The priority determination program 221 sets the determined priority value in the resource migration schedule information 212 (Step S115).

When the migration target is only a volume (Step S103: VOL only), the priority determination program 221 determines the priority of the record (resource migration) to be 6. The priority determination program 221 sets the determined priority value in the resource migration schedule information 212 (Step S116).

When the migration target is a virtual machine and a volume associated with each other (Step S103: both VM and VOL), the priority determination program 221 determines the priority of the record (resource migration) to be 7. The priority determination program 221 sets the determined priority value in the resource migration schedule information 212 (Step S117).

In Step S101, when the locality changes from a state in which there is locality to a state in which there is not locality (Step S101: YES to NO), the priority determination program 221 determines the resource to be migrated indicated by the record (Step S104). When the migration target is only a virtual machine (Step S104: VM only), the priority determination program 221 determines that the priority of the record (resource migration) to be 8. The priority determination program 221 sets the determined priority value in the resource migration schedule information 212 (Step S118).

When the migration target is only a volume (Step S104: VOL only), the priority determination program 221 determines the priority of the record (resource migration) to be 9. The priority determination program 221 sets the determined priority value in the resource migration schedule information 212 (Step S119).

When the migration target is a virtual machine and a volume associated with each other (Step S104: both VM and VOL), the priority determination program 221 determines the priority of the record (resource migration) to be 10. The priority determination program 221 sets the determined priority value in the resource migration schedule information 212 (Step S120).

Next, the priority determination program 221 determines whether or not there is a resource migration (record) having an undetermined priority remaining in the resource migration schedule information 212 (Step S131). When there is not a resource migration having an undetermined priority (Step S131: NO), the processing ends, and when there is a resource migration having an undetermined priority (Step S131: YES), the processing flow returns to Step S101.

Figure 8:
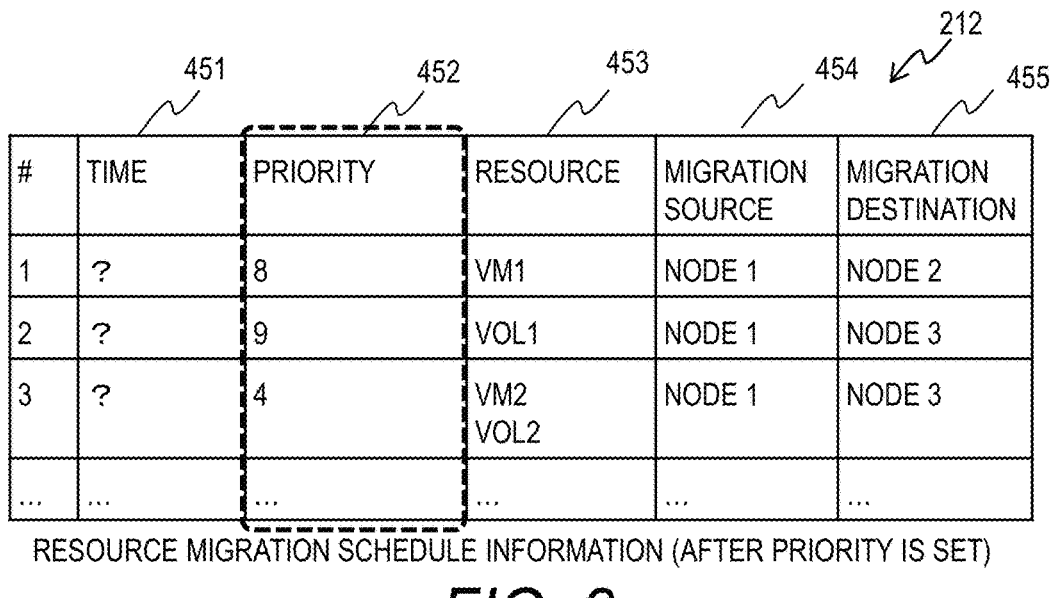
FIG. 8 is a table for showing an example of the resource migration schedule information in which the priorities are set.

FIG. 8 is a table for showing an example of the resource migration schedule information 212 in which the priorities are set. As described above, the priority determination program 221 determines the priority of each resource migration record in accordance with the processing flow of FIG. 7, and writes the determined priorities in the priority field 452. At this time, the resource migration start time is not yet determined.

The resource migration period is determined by prioritizing migrations having a higher priority. As described above, the priority determination program 221 gives a higher priority to a migration having a state after migration in which there is locality than a migration having a state after migration in which there is not locality. As a result, during the resource reallocation period in which a plurality of resource migrations specified by the resource migration schedule information 212 are executed, the ratio of having locality can be increased and the load on the entire computer system can be reduced. As a result, it is possible to suppress a reduction in the performance of the computer system during the resource reallocation period.

Further, in a migration in which the state after migration is in a state in which there is locality, the priority determination program 221 gives a higher priority to a migration in which the state before migration is a state in which there is not locality than a migration in which the state before migration is a state in which there is locality. As a result, the ratio of having locality can be increased during the resource reallocation period in which a plurality of resource migrations specified by the resource migration schedule information 212 are executed.

Further, in a migration in which the state after migration is in a state in which there is not locality, the priority determination program 221 gives a higher priority to a migration in which the state before migration is a state in which there is not locality than a migration in which the state before migration is a state in which there is locality. As a result, the ratio of having locality can be increased during the resource reallocation period in which a plurality of resource migrations specified by the resource migration schedule information 212 are executed.

The same priority may be given to all migrations in which the state after migration is a state in which there is locality. Further, the same priority may be given to all migrations in which the state after migration is a state in which there is not locality.

In the example described with reference to FIG. 7, for migrations indicating the same locality change, the priority is set depending on the migration target. Specifically, the priority determination program 221 gives a higher priority to migrations having a shorter migration time. In other words, a migration of only a virtual machine has the highest priority, and a migration of both a virtual machine and a volume has the lowest priority. This enables the migrations to be completed more quickly. The same priority may be given to all migration target cases.

In another example, in a migration from a state in which there is locality to a state in which there is not locality, the priority determination program 221 may give the lowest priority to a migration of only a virtual machine. Through giving of the lowest priority to the migration of only a virtual machine, it is possible to keep the transition period in which there is locality for a long time, and thus increase the ratio of the state in which there is locality.

As described above, the priority determination program 221 determines the priorities so as to prioritize resource migrations in which there is locality. Among those migrations, migrations that do not take time for the resource migration itself are given a higher priority. In contrast, when there is no longer locality, the priority of a migration from having locality to not having locality is reduced. The priority of migrations from a state in which there is locality to a state in which there is not locality is reduced.

Figure 9:
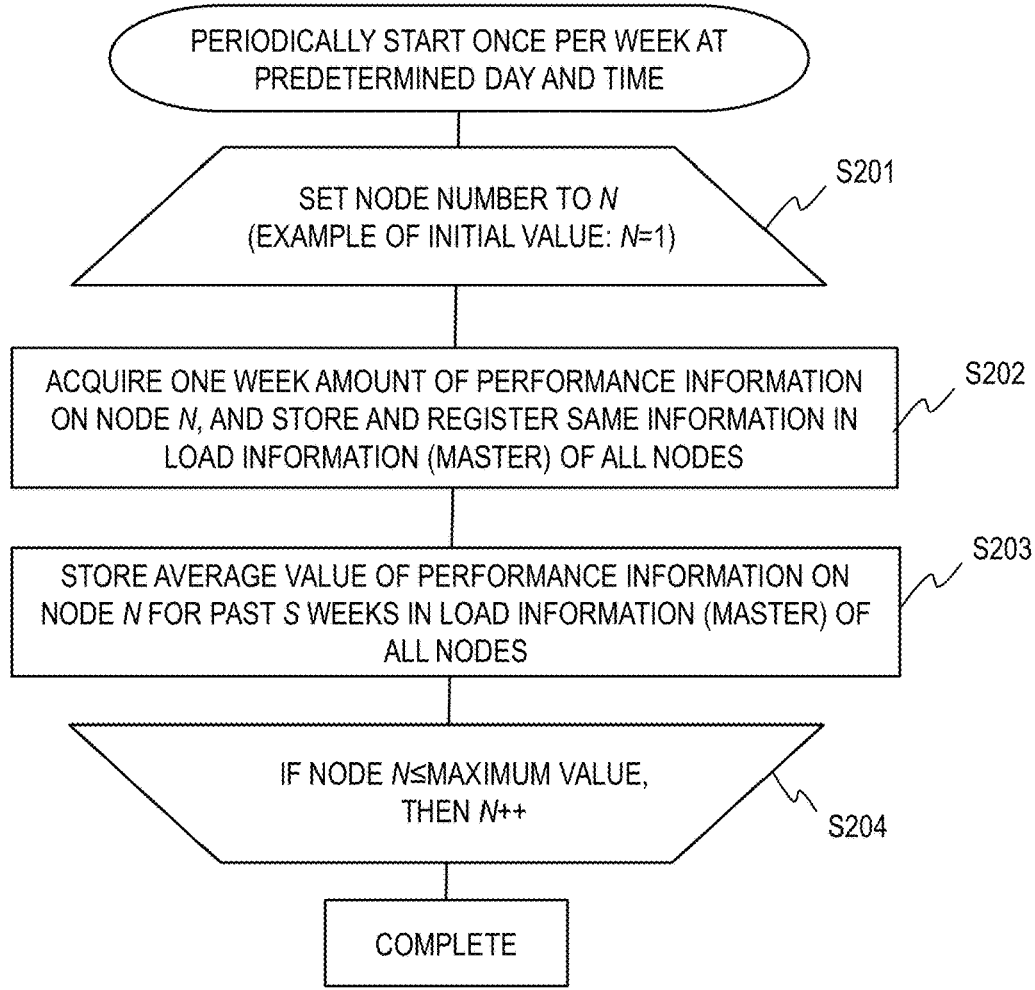
FIG. 9 is a flowchart for illustrating an example of a method of generating the load information (master) to be executed by the load information generation program.

Next, there is described an example of a method of generating the load information (master) 213. FIG. 9 is a flowchart for illustrating an example of a method of generating the load information (master) 213 to be executed by the load information generation program 224. The load information generation program 224 acquires the history of the CPU load and the I/O load of each of a plurality of nodes, and generates the load information (master) 213 based on the statistical values of the acquired histories.

In the example illustrated in FIG. 9, a change over time in the load estimation value in units of one week is set. The load estimation value in units of one week is the average of the measured values of the change of time in the load for S weeks. The load information generation program 224 updates the load information (master) 213 with new measured values each week. In the example described below, it is assumed that all of the nodes store the load information (master) 213 for all the nodes.

The load information generation program 224 sets a node number N (Step S201). The initial value of the node number is the minimum value, for example, 1. The load information generation program 224 acquires from the node N the performance information for one week of the node N, and stores the same information in the load information (master) 213 of all the other nodes (Step S202). The load information generation program 224 stores the average value of the performance information on the node N for the past S weeks (for example, 3 weeks) in the load information (master) 213 of all the nodes (Step S203). The load information generation program 224 ends the processing when N reaches the maximum value of the node number. When N has not reached the maximum value, the load information generation program 224 increments N, and the processing flow returns to Step S201.

Figure 10:
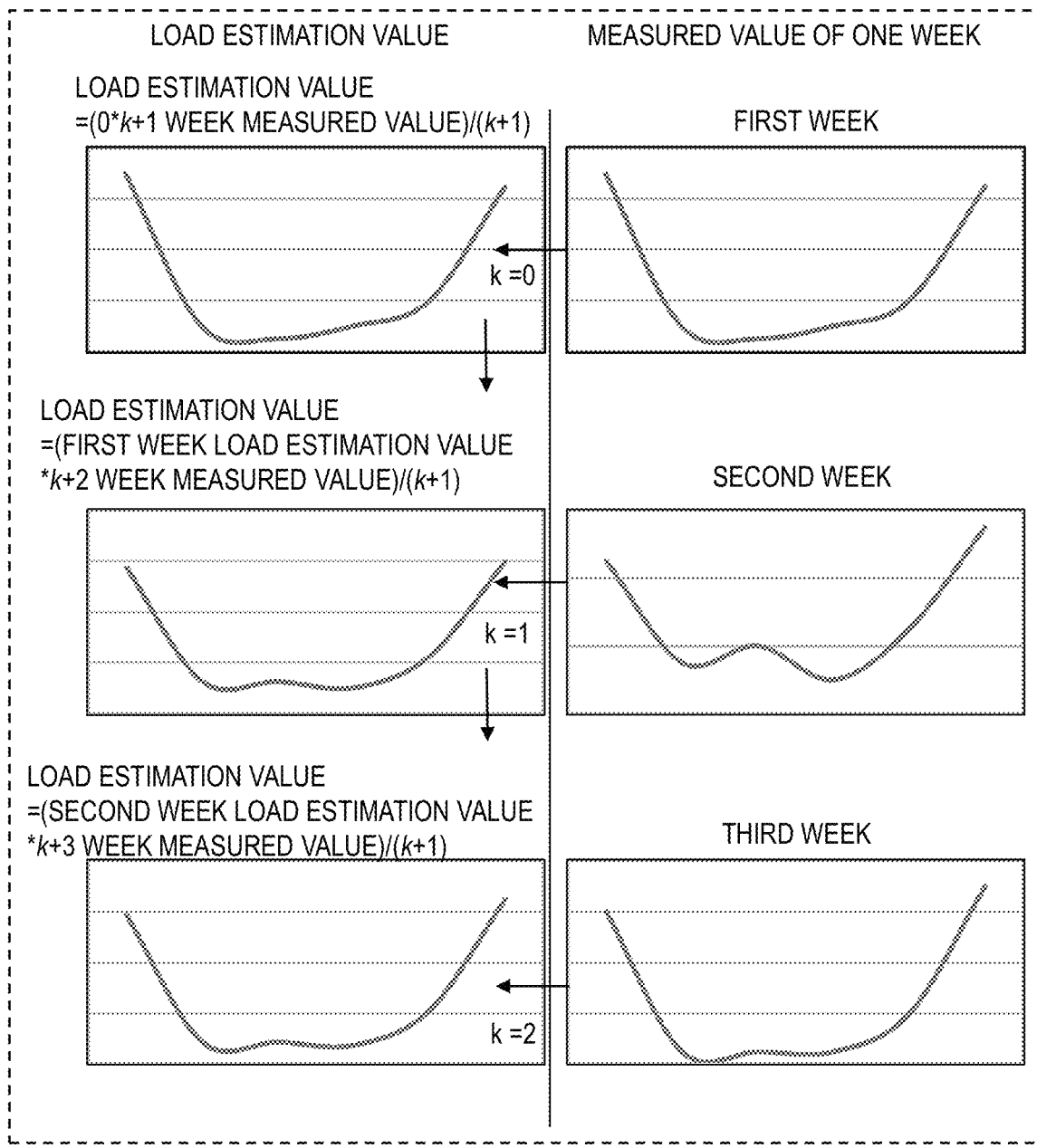
In FIG. 10, there is shown an example of a method of calculating the change over time in the load estimation value for the first three weeks of one node.

In FIG. 10, there is shown an example of a method of calculating the change over time in the load estimation value for the first three weeks of one node. The load estimation value is the average value of the measured values for three weeks. For the first two weeks, measured values for three weeks do not yet exist. Therefore, the load estimation value for the first week is the measured value of the first week, and the load estimation value for the second week is the average value of the measured values for the first week and the second week.

Figure 11A:
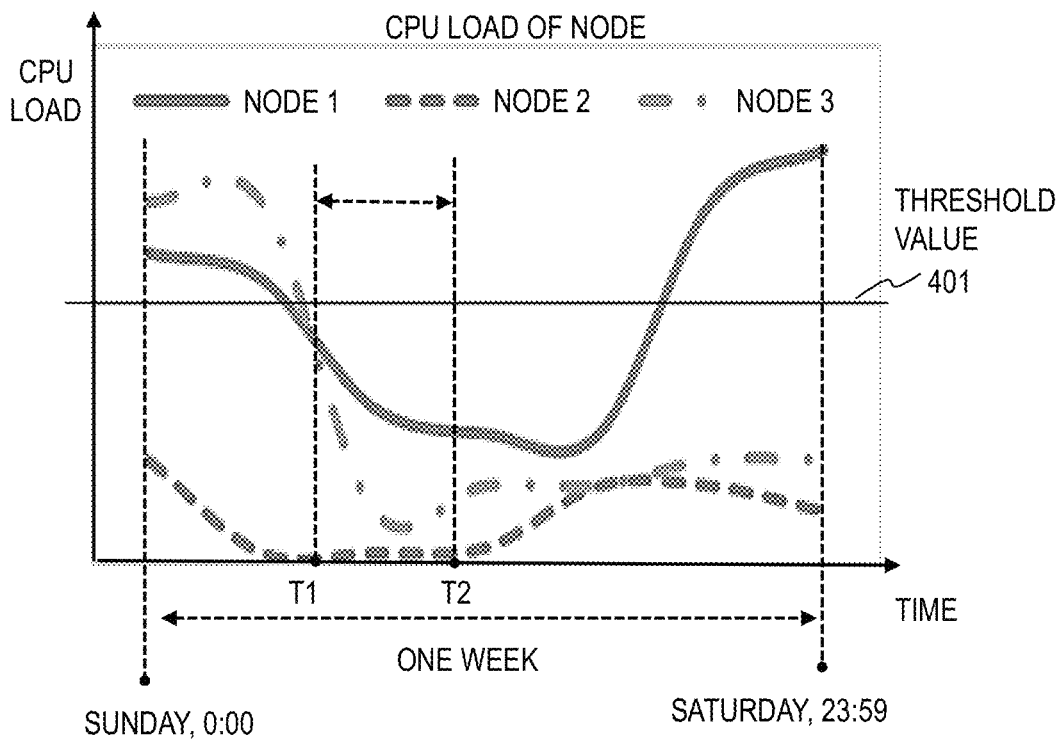
FIG. 11A is a graph for showing the estimation value for the change over time for one week in the CPU load of three nodes.
Figure 11B:
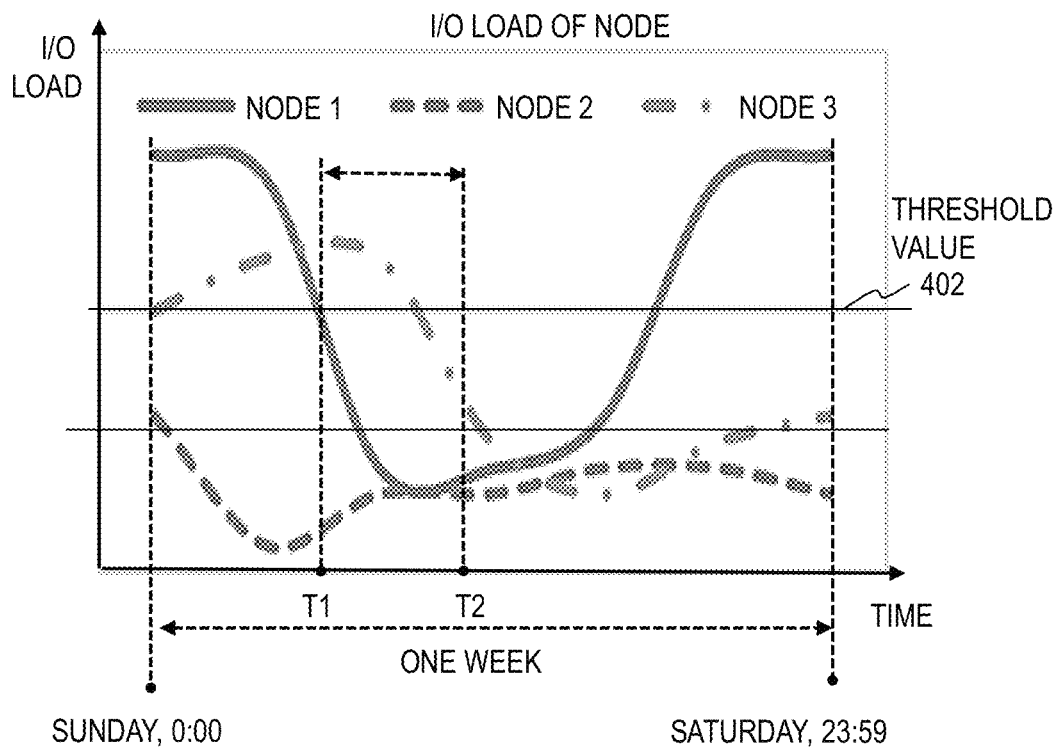
FIG. 11B is a graph for showing the estimation value for the change over time for one week in the I/O load of the three nodes.

The resource reallocation scheduling based on the priority and the node load is now specifically described. FIG. 11A is a graph for showing the estimation value for the change over time for one week in the CPU load of three nodes, and FIG. 11B is a graph for showing the estimation value for the change over time for one week in the I/O load of the three nodes. In the graph of FIG. 11A, the horizontal axis represents time and the vertical axis represents the CPU load estimation value. In the graph of FIG. 11B, the horizontal axis represents time and the vertical axis represents the I/O load estimation value. In FIG. 11A and FIG. 11B, there are shown the load estimation values for resource migration from the node 1 to the node 2. The solid line indicates the load of the node 1, the broken line indicates the load of the node 2, and the alternate long and short dash line indicates the load of the node 3.

The load estimation values of the node 1 and the node 2 indicate the sum of the load estimation value due to normal operation and the load estimation value due to the resource migration. The load estimation value of the node 3 indicates only the load estimation value in normal operation. The load estimation value in normal operation is the average of the measured values for the past three weeks as described above.

For example, the load (load per unit time) in the migration of the virtual machine and the volume is set in advance for each migration source node and migration destination node in accordance with the data transfer rate. The migration period can be calculated in accordance with the data transfer rate between the nodes and the size of the virtual machine and the volume. The migration load and the migration period may be estimated by any method.

The resource migration schedule determination program 222 calculates, for each migration source node and migration destination node, the sum of the estimation value based on the history information on the CPU load and the I/O load and the estimation value of the amount of increase in the CPU load and the I/O load due to the resource migration. The period in which the sum of those estimation values at the migration source nodes and the migration destination nodes is less than the threshold values 401 and 402 is determined as the migration period of the resource. The threshold values 401 and 402 may be common to all the nodes or different for each node.

In the example of FIG. 11A and FIG. 11B, the period from a time T1 to a time T2 is selected as the migration period. The resource migration schedule determination program 222 estimates the length of the migration period from the resource to be migrated and configuration information on the migration source node and the migration destination node. As the start time of the migration period, for example, the earliest time in the period in which the estimation values of the CPU load and the I/O load including the migration load are less than the threshold values may be selected.

The resource migration schedule determination program 222 sequentially selects a record (resource migration) from the resource migration schedule information 212 in descending order of priority, and determines a possible migration period. As described above, resource migration applies a migration load on the migration source node and the migration destination node.

Therefore, in the determination of the migration period of the selected migration record, the resource migration schedule determination program 222 determines a new migration schedule for the migration record based on the sum of the load estimation value in normal operation and the migration loads of the migration records determined so far.

Figure 12:
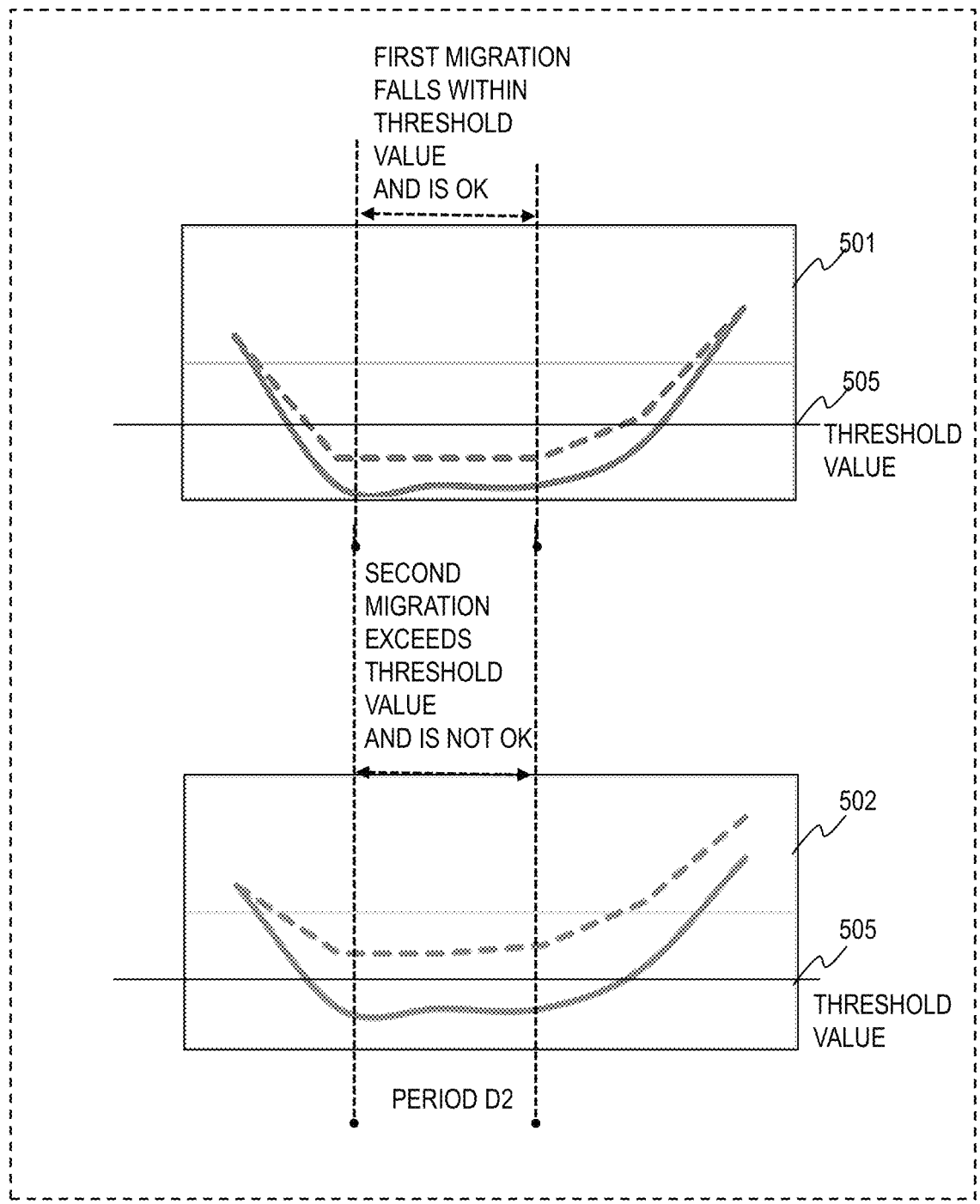
In FIG. 12, there is shown an example of changes in the node load estimation value occurring due to the addition of a migration load.

In FIG. 12, there is shown an example of changes in the node load estimation value occurring due to the addition of a migration load. A graph 501 shows the change over time in the load estimation value before and after the addition of the migration load. Specifically, the solid line indicates the change over time in the load estimation value in normal operation of the migration source node or the migration destination node indicated by the load information (master) 213. The broken line indicates the change over time in the load estimation value obtained by adding a first migration load to the load estimation value of normal operation. In the graph 501, the load estimation value obtained by adding the migration load is always less than a threshold value 505 in a period D2. Therefore, this first migration is acceptable.

A graph 502 shows the change over time in a load estimation value obtained by adding a new second migration load to the load estimation value obtained by adding the first migration load in the graph 501. Specifically, the solid line indicates the change over time in the load estimation value obtained by adding the first migration load in the graph 501. The broken line indicates the change over time in the load estimation value obtained by adding the second migration load to the first migration load. The load estimation value obtained by adding the second migration load exceeds the threshold value 505 in the period D2. Therefore, the second migration during this period is prohibited.

The resource migration schedule determination program 222 determines the migration period by prioritizing migrations having a higher priority. As a result, it is possible to suppress an increase in the load on the computer system in resource reallocation including a plurality of resource migrations.

Figure 13:
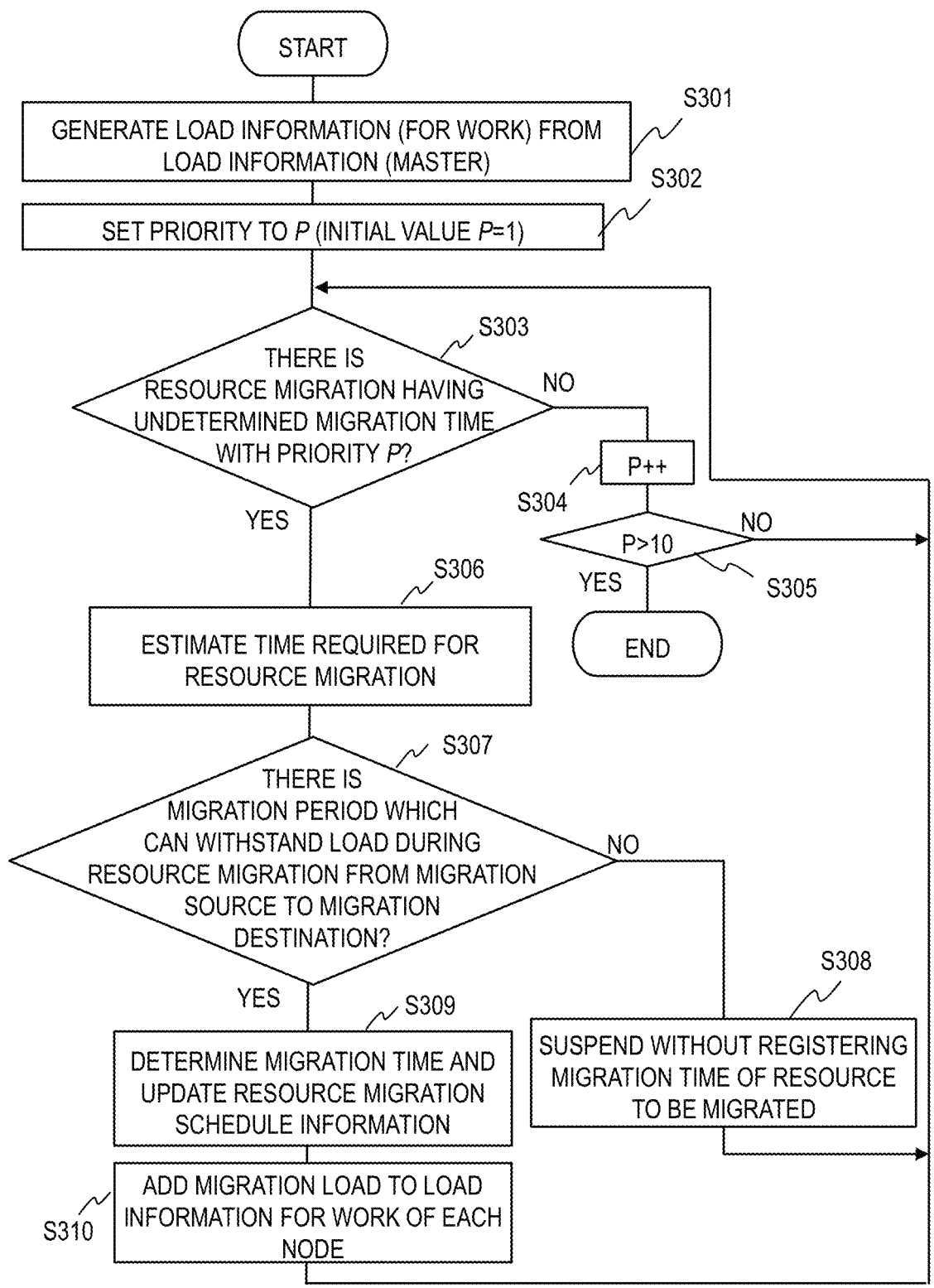
FIG. 13 is a flowchart for illustrating an example of resource reallocation schedule determination processing to be executed by the resource migration schedule determination program.

FIG. 13 is a flowchart for illustrating an example of resource reallocation schedule determination processing to be executed by the resource migration schedule determination program 222. The resource migration schedule determination program 222 copies the load information on each node from the load information (master) 213, and generates the load information (for work) 214 (Step S301).

The resource migration schedule determination program 222 sets the a variable P representing the priority (Step S302). The initial value of the variable P is 1. Next, the resource migration schedule determination program 222 refers to the resource migration schedule information 212, and searches for a resource migration having an undetermined migration time among the resource migrations (records) having the priority P (Step S303).

When there is no resource migration having the priority P and having an undetermined migration time (Step S303: NO), the resource migration schedule determination program 222 increments the priority variable P (Step S304), and determines whether or not the value of the priority variable P exceeds 10 (maximum value) (Step S305). When the value of the priority variable P exceeds 10 (Step S305: YES), the processing ends. When the value of the priority variable P is 10 or less (Step S305: NO), the processing flow returns to Step S303.

In Step S303, when there is a resource migration having an undetermined time (Step S303: YES), the resource migration schedule determination program 222 estimates the time required for the resource migration (Step S306). The resource migration schedule determination program 222 estimates the time required for the migration from, for example, the size of the resource, configuration information on the migration source node and the migration destination node, and information on the network configuration between the nodes. The node configuration information includes, for example, information on storage drive speed, and the network configuration information includes, for example, information on bandwidth.

Next, the resource migration schedule determination program 222 determines whether or not the migration source node and the migration destination node specified by the resource migration record have a migration period which can withstand the load due to the resource migration (Step S307).

Specifically, in the time length having the length determined in Step S306, the resource migration schedule determination program 222 searches for a period in which the value obtained by adding the migration load to the load estimation value indicated by the load information (for work) 214 does not exceed the threshold value. The migration load is set in advance for each node for each of the virtual machine and the volume, for example.

When there is no migration period which can withstand the load due to the resource migration (Step S307: NO), the resource migration schedule determination program 222 suspends the migration period without registering the migration time of the resource to be migrated (Step S308). After that, the processing flow returns to Step S303.

When there is a migration period which can withstand the load due to the resource migration (Step S307: YES), the resource migration schedule determination program 222 determines the migration start time and updates the resource migration schedule information 212. The migration start time may be, for example, the earliest possible time. The migration start time may also be determined based on any other method.

In the determined migration period, the resource migration schedule determination program 222 adds the migration load estimation value to the load estimation value of the load information (for work) 214 (Step S310). After that, the processing flow returns to Step S303.

As described above, by determining the migration period through prioritization of resource migrations having a higher priority based on locality, it is possible to suppress an increase in the load on the computer system during resource reallocation involving a plurality of resource migrations.

FIG. 14A is a table for showing a configuration example of the load information (master) 213 of a given one node. FIG. 14B is a table for showing a configuration example of the load information (for work) 214 of the same node updated by the resource reallocation processing described with reference to FIG. 13. As described above, the load information (master) 213 indicates the change over time in the load estimation value determined from the load measured values in the normal operation period of the node outside the resource reallocation processing period. In the example of FIG. 14A, the CPU load estimation value and the I/O load estimation value are shown for every minute in one week.

As described above, the resource migration schedule determination program 222 updates the load information (for work) 214 by sequentially adding the migration loads of the resources (records) in which the resource migration schedule information 212 indicates the determination of the migration period to the load information (for work) 214. In the load information (for work) 214 shown in FIG. 14B, the CPU load estimation value and the I/O load estimation value are updated by adding the resource migration load to the load information (master) 213 shown in FIG. 14A.

Figures 15, 16:
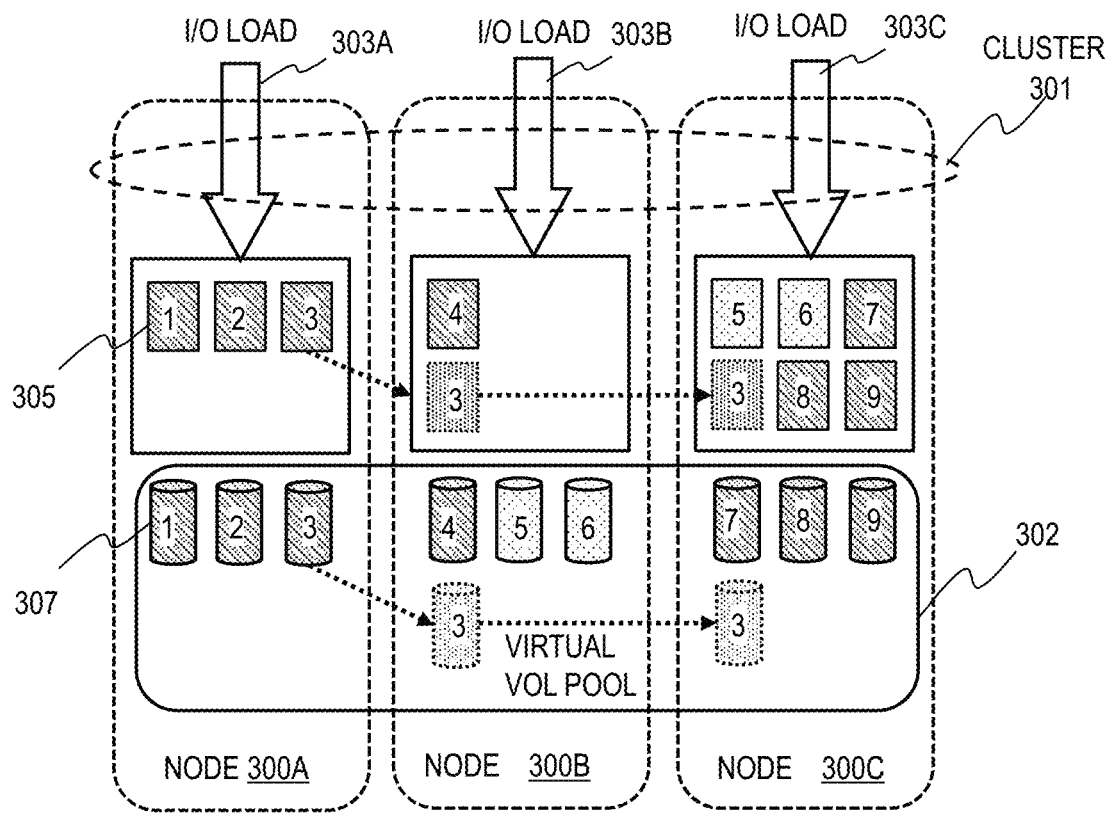
FIG. 15 is an exemplary table for showing how the values in the time field of the resource migration schedule information are updated.
FIG. 16 is a diagram for schematically illustrating an example of resource migration from a migration source node to a migration destination node via an intermediate node.

FIG. 15 is an exemplary table for showing how the values in the time field of the resource migration schedule information 212 are updated. As described with reference to FIG. 13, the resource migration schedule determination program 222 determines the migration start time of each resource migration record of the resource migration schedule information 212, and registers the value of the migration start time. The resource migration schedule information 212 is stored in, for example, all nodes.

As illustrated in Step S307 and Step S308 of FIG. 13, when a migration period in which the node load is less than the threshold value is not found, the migration period of the resource migration is suspended. There is now described an example of a migration method of a resource having a suspended migration period. In another example, a period in which the maximum value of the node load is the smallest may be selected as the migration period.

In the example described below, the resource is migrated from the migration source node to an intermediate node having spare load capacity, and the resource is then migrated from the intermediate node to the migration destination node. As a result, it is possible to migrate a resource that is not directly migratable from the migration source node to the migration destination node because the load on the node is too heavy, while keeping the load on the node below the threshold value.

FIG. 16 is a diagram for schematically illustrating an example of resource migration from a migration source node to a migration destination node via an intermediate node. Here, there are mainly described the differences from the direct migration of a resource from the migration source node to the migration destination node illustrated in FIG. 3. In this example, the virtual machines (3) 305 and the volume (3) 307 associated with each other are migrated from the migration source node 300A to the migration destination node 300C via the intermediate node 300B.

Figure 17:
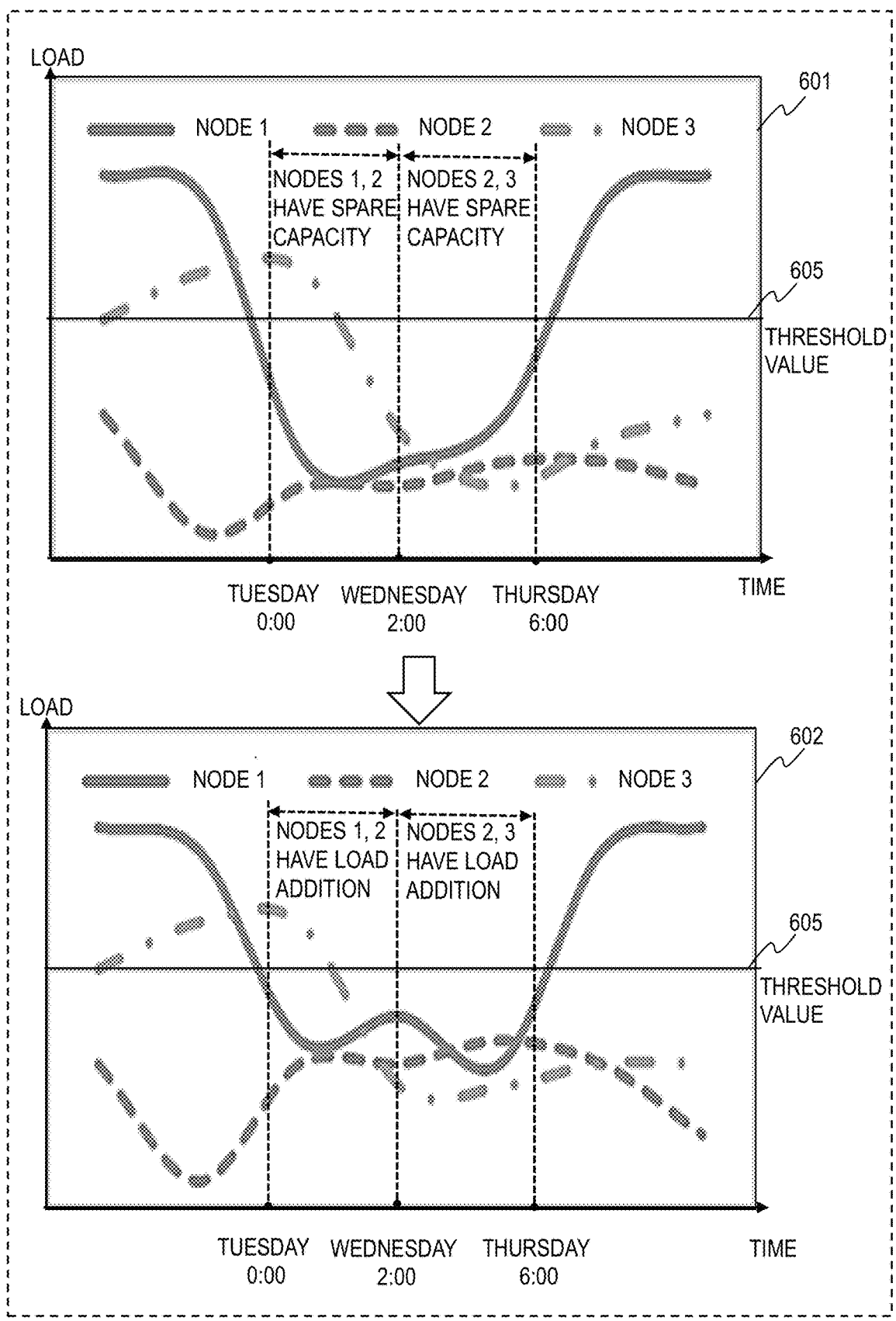
In FIG. 17, there is shown an example of the migration period and the load information in resource migration via an intermediate node.

In FIG. 17, there is shown an example of the migration period and the load information in resource migration via an intermediate node. In the example of FIG. 17, it is assumed that the migration source node is the node 1, the migration destination node is the node 3, and the intermediate node is the node 2. A graph 601 shows the change over time in the load estimation value of the three nodes indicated by the load information (master) 213. The solid line indicates the load of the node 1, the broken line indicates the load of the node 2, and the alternate long and short dash line indicates the load of the node 3. The load on each node is required to be less than a threshold value 605.

In the graph 601, in the period from 0:00 on Tuesday to 2:00 on Wednesday, the node 1 and the node 2 have spare load capacity, and the load of the node 3 exceeds the threshold value 605. During the period from 2:00 on Wednesday to 6:00 on Thursday, the node 2 and the node 3 have spare load capacity, but the maximum value of the load of the node 1 is close to the threshold value 605 and there is no spare load capacity.

In this example, it is supposed that the resource is migrated from the migration source node 1 to the intermediate node 2 during the period from 2:00 on Wednesday to 6:00 on Thursday, and the resource is then migrated from the intermediate node 2 to the migration destination node 3 during the period from 2:00 on Wednesday to 6:00 on Thursday.

In a graph 602, there is shown the change over time in the load estimation value of the nodes 1, 2 and 3 exhibited when the resource is migrated from the migration source node 1 to the intermediate node 2 during the period from 2:00 on Wednesday to 6:00 on Thursday, and then migrated from the intermediate node 2 to the migration destination node 3 during the period from 2:00 on Wednesday to 6:00 on Thursday. The resource migration load from the node 1 to the node 2 is added to the graph 601. During all periods, the load on all the nodes is less than the threshold value 605.

Figure 18:
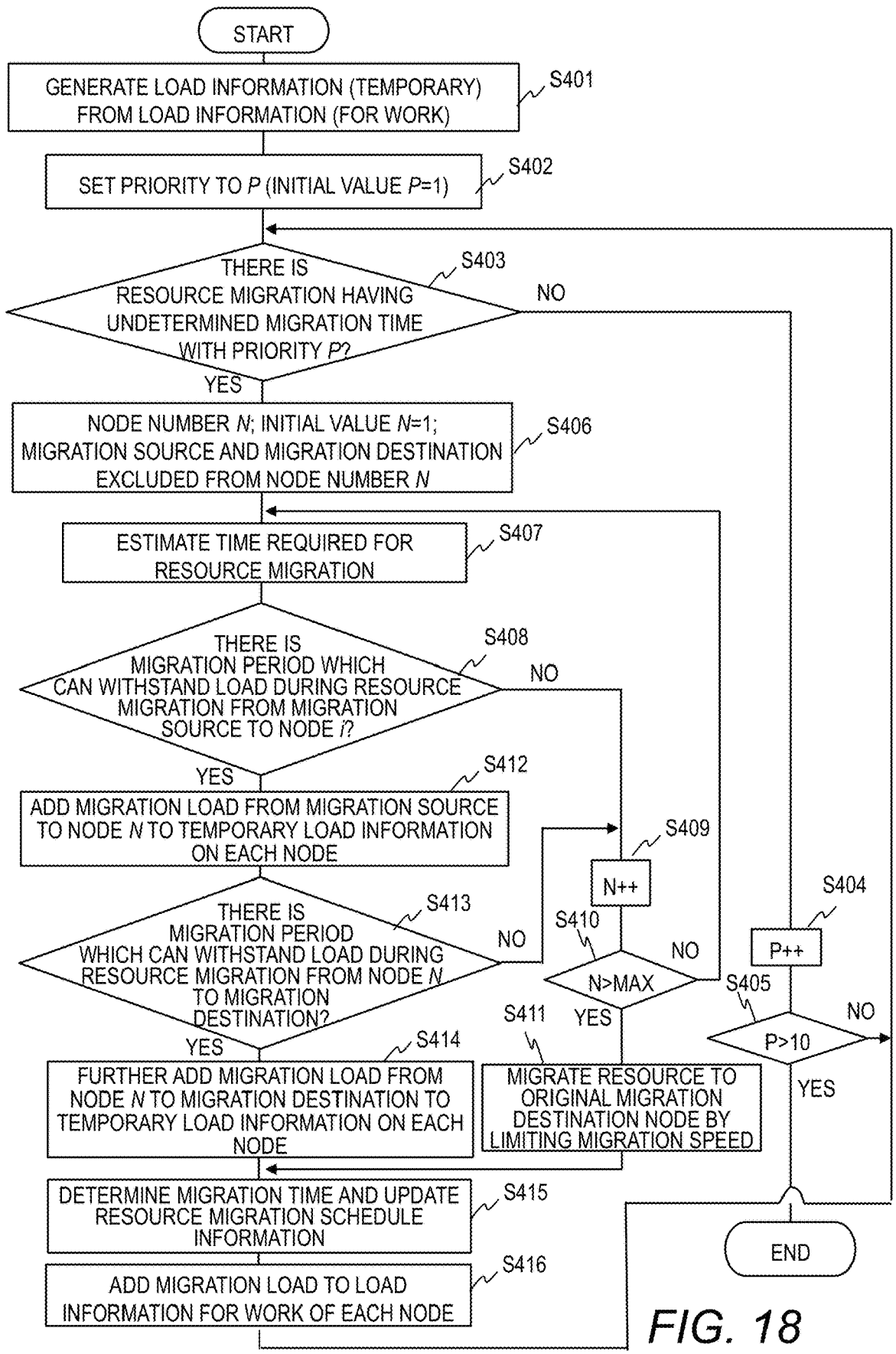
FIG. 18 is a flowchart for illustrating a processing example of determining the migration period of the resource migration having a suspended migration period in the processing flow illustrated in FIG. 13.

FIG. 18 is a flowchart for illustrating a processing example of determining the migration period of the resource migration having a suspended migration period in the processing flow illustrated in FIG. 13. The resource migration schedule determination program 222 copies the load information on each node from the load information (for work) 214, and generates the load information (temporary) 215 (Step S401).

The resource migration schedule determination program 222 sets the variable P representing the priority (Step S402). The initial value of the variable P is 1. Next, the resource migration schedule determination program 222 refers to the resource migration schedule information 212, and searches for a resource migration having an undetermined migration time among the resource migrations (records) having the priority P (Step S403).

When there is no resource migration having the priority P and having an undetermined migration time (Step S403: NO), the resource migration schedule determination program 222 increments the priority variable P (Step S404), and determines whether or not the value of the priority variable P exceeds 10 (maximum value) (Step S405). When the value of the priority variable P exceeds 10 (Step S405: YES), the processing ends. When the value of the priority variable P is 10 or less (Step S405: NO), the processing flow returns to Step S403.

In Step S403, when there is a resource migration having an undetermined time (Step S403: YES), the resource migration schedule determination program 222 defines a node number variable N (Step S406). The initial value of N is 1, and the migration source node and the migration destination node are excluded from the node number.

Next, the resource migration schedule determination program 222 estimates the time required for each of the resource migration from the migration source node to the intermediate node having the node number N and the resource migration from the intermediate node to the migration destination node (Step S407). The estimation method may be the same as the method described with reference to FIG. 13.

Next, the resource migration schedule determination program 222 determines whether or not the migration source node and the intermediate node having the node number N (intermediate node N) specified by the resource migration record have a migration period which can withstand the load due to the resource migration (Step S408). Specifically, in the time length having the length determined in Step S407, the resource migration schedule determination program 222 searches for a period in which the value obtained by adding the migration load to the load estimation value indicated by the load information (temporary) 215 does not exceed the threshold value.

When there is not a migration period which can withstand the load due to the resource migration (Step S408: NO), the resource migration schedule determination program 222 increments the node number variable N (Step S409), and further determines whether or not the value of the variable N is greater than the maximum value (Step S410).

When the variable N is greater than the maximum value (Step S410: YES), the resource migration schedule determination program 222 determines that the resource is to be migrated from the migration source node to the migration destination node by limiting the migration speed of the resource (Step S411). When there is no spare load capacity in both the migration source node and the migration destination node, the migration load (load per unit time) can be reduced by limiting the migration speed of the resource. After Step S411, the processing flow advances to Step S415. When migration at the normal migration speed is not possible, the resource migration schedule determination program 222 may determine to perform low-speed migration without using an intermediate node.

In Step S410, when the variable N is equal to or less than the maximum value (Step S410: NO), the processing flow returns to Step S407. In Step S408, when there is a migration period which can withstand the load due to the resource migration (Step S408: YES), the resource migration schedule determination program 222 adds, in the determined migration period, the migration load estimation value to the load estimation value of the load information (temporary) 214 from the migration source node to the intermediate node (Step S412).

Next, the resource migration schedule determination program 222 determines whether or not there is a period in which the intermediate node having the node number N (intermediate node N) and the migration destination node specified by the resource migration record can withstand the load due to the resource migration (Step S413). Specifically, in the time length having the length determined in Step S407, the resource migration schedule determination program 222 searches for a period in which the value obtained by adding the migration load to the load estimation value indicated by the load information (temporary) 215 does not exceed the threshold value.

When there is not a migration period which can withstand the load due to the resource migration (Step S413: NO), the resource migration schedule determination program 222 returns the load information (temporary) 215 to the state before the update of Step S412, and the processing flow proceeds to Step S409. When there is a migration period which can withstand the load due to the resource migration (Step S413: YES), the resource migration schedule determination program 222 adds, in the determined migration period, the migration load estimation value to the load estimation value of the load information (temporary) 214 from the intermediate node to the migration source node (Step S414).

Next, the resource migration schedule determination program 222 determines each of the migration start time from the migration source node to the intermediate node and the migration start time from the intermediate node to the migration destination node, and updates the resource migration schedule information 212 (Step S415). The method of determining the migration start time in resource migration at normal speed is the same as that in the flowchart illustrated in FIG. 13.

When it is determined in Step S411 that the resource is to be migrated at a slower speed than normal speed, the resource migration schedule determination program 222 determines the time required for the migration in accordance with the migration speed, and further determines the migration period. The limited migration speed may be set in advance, and may be determined in accordance with the load state of the migration destination node and the migration source node before adding the migration load. When limitation of the migration speed does not reduce the load on the node to less than the threshold value, a migration time is included in the next or later schedule, for example, the following week.

Next, the resource migration schedule determination program 222 reflects the update of the load information (temporary) 214 in the load information (for work) 213 (Step S416). The migration load is added to the load of each of the migration source node, the intermediate node, and the migration destination node. After Step S416, the processing flow returns to Step S403.

As described above, through use of the intermediate node, it is possible to migrate a resource that is not directly migratable from the migration source node to the migration destination node. Further, the search for the intermediate node is performed by prioritizing nodes having higher priority, and an intermediate node is searched for in descending order of priority. Therefore, the load on the node in the resource reallocation can be suppressed. It should also be noted that the intermediate node may be searched for in an order that is not related to priority.

FIG. 19 is a table for showing a configuration example of the load information (temporary) 215. As described above, the load information (temporary) 215 is generated by copying the load information (for work) 214, and is then updated. Therefore, the load information (temporary) 215 has the same fields as those of the load information (for work) 214.

As described above, the load information (temporary) 215 is used in order to consider whether or not the resource migration is possible via an intermediate node. When the resource is not migratable via an intermediate node candidate, the update to the information on the intermediate node is canceled. The load information (temporary) 215 may be stored only on the nodes for which the resource migration schedule determination program 222 is to be executed, or may be stored on other nodes as well.

FIG. 20 is a table for schematically showing an example of the update to the resource migration schedule information 212 which occurs together with the determination of the migration period of the resource migration via an intermediate node. In the example of FIG. 20, the migration method and the migration period of the migration of the virtual machine 1 and the volume 1 from the migration source node 1 to the migration destination node 3 indicated by the resource migration record "1" are determined.

In this example, the resources are migrated via the intermediate node 2. Therefore, in the resource migration record "1", the migration destination node is changed from the node 3 to the node 2, and a record "2" indicating the migration from the intermediate node 2 to the migration destination node 3 is inserted. The migration start time from the migration source node 1 to the intermediate node 2 is set to 0:00 on Tuesday, and the migration start time from the intermediate node 2 to the migration destination node 3 is set to 2:00 on Wednesday.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings show control lines and information lines as considered necessary for explanations but do not show all control lines or information lines in the products. It can be considered that almost of all components are actually interconnected.

What is claimed is:

1. An apparatus for determining a migration schedule of a resource including a virtual machine and a volume in a cluster including a plurality of nodes, the apparatus comprising:
   one or more processors; and
   one or more storage devices,
   the one or more storage devices being configured to store resource migration schedule information including a plurality of records,
   wherein each of the plurality of records indicates a migration source node and a migration destination node of each of one or more resources,
   wherein the one or more processors are configured to determine a priority of each of the plurality of records such that a record having locality after migration has a higher priority than a priority of a record without locality after migration,
   wherein the locality after migration is determined based on whether a virtual machine and a volume associated with each other will be hosted in the same node,
   wherein a locality before migration is determined based on whether a virtual machine and a volume associated with each other are hosted on the same node before migration and is considered in assigning priorities,
   wherein the one or more processors are configured to determine a migration schedule of each of the plurality of records based on the priority of each of the plurality of records.

2. The apparatus according to claim 1, wherein the one or more processors are configured to determine the priority of each of the plurality of records such that a record having locality after migration and without locality before migration has a higher priority than a priority of a record having locality after migration and having locality before migration.

3. The apparatus according to claim 1, wherein the one or more processors are configured to determine the priority of each of the plurality of records such that a record without locality after migration and without locality before migration has a higher priority than a priority of a record without locality after migration and having locality before migration.

4. The apparatus according to claim 1,
   wherein a first record included in the plurality of records indicates migrating a virtual machine and a volume associated with each other in advance from the same migration source node, and
   wherein the one or more processors are configured to determine to migrate, in the migration indicated by the first record, the virtual machine after migration of the volume.

5. The apparatus according to claim 4, wherein the one or more processors are configured to determine to migrate the virtual machine after the migration of the volume in any one of a case in which the first record indicates migrating the virtual machine and the volume to the same migration destination node and a case in which the first record indicates migrating the virtual machine and the volume to different migration destination nodes.

6. The apparatus according to claim 1, wherein the one or more processors are configured to determine the priority of a record without locality before migration and having locality after migration such that a record indicating migrating only a virtual machine has a higher priority than a priority of a record indicating migrating a volume.

7. The apparatus according to claim 1,
   wherein the one or more storage devices are configured to store information on a change over time in a load estimation value of each of the plurality of nodes, and
   wherein the one or more processors are configured to:
      determine, based on the information on the change over time in the load estimation value of each of the migration source node and the migration destination node indicated by a second record, and a migration load estimation value of a migration indicated by the second record, whether the migration indicated by the second record is executable within a predetermined period; and
      search the plurality of nodes for an intermediate node configured to mediate migration of a resource from the migration source node to the migration destination node indicated by the second record within the predetermined period when it is determined that the migration indicated by the second record is not executable within the predetermined period.

8. The apparatus according to claim 7, wherein the one or more processors are configured to search for the intermediate node from among nodes having a higher priority.

9. The apparatus according to claim 1, wherein the one or more processors are configured to determine to perform the migration indicated by a second record determined as being not executable within a predetermined period, at a slower transfer rate.

10. A method of determining, by an apparatus, a migration schedule of a resource including a virtual machine and a volume in a cluster including a plurality of nodes,
   the apparatus being configured to store resource migration schedule information including a plurality of records, each of the plurality of records indicating a migration source node and a migration destination node of each of one or more resources, the method comprising:

determining, by the apparatus, a priority of each of the plurality of records such that a record having locality after migration has a higher priority than a priority of a record without locality after migration, the locality after migration being determined based on whether a virtual machine and a volume associated with each other will be hosted in the same node; and determining, by the apparatus, a migration schedule of each of the plurality of records based on the priority of each of the plurality of records, wherein a locality before migration is determined based on whether a virtual machine and a volume associated with each other are hosted on the same node before migration and is considered in assigning priorities.

11. A computer-readable non-transitory storage medium having stored thereon a command code for causing a computer system to execute processing, the computer system being configured to store resource migration schedule information including a plurality of records, each of the plurality of records indicating a migration source node and a migration destination node of each of one or more resources, the processing comprising determining a priority of each of the plurality of records such that a record having locality after migration has a higher priority than a priority of a record without locality after migration, the locality after migration being determined based on whether a virtual machine and a volume associated with each other will be hosted in advance exists in the same node, the processing comprising determining a migration schedule of each of the plurality of records based on the priority of each of the plurality of records, wherein a locality before migration is determined based on whether a virtual machine and a volume associated with each other are hosted on the same node before migration and is considered in assigning priorities.

\* \* \* \* \*